United States Patent
Kilpatrick, II et al.

(10) Patent No.: US 9,485,771 B2
(45) Date of Patent: Nov. 1, 2016

(54) RANDOM ACCESS USING PREDICTIVE MOBILITY

(71) Applicant: QUALCOMM Incorporated, San Diego, CA (US)

(72) Inventors: Thomas Kilpatrick, II, San Diego, CA (US); Olufunmilola Awoniyi-Oteri, San Diego, CA (US); Amir Sarajedini, San Diego, CA (US); Roy Franklin Quick, Jr., San Diego, CA (US); Patrik Nils Lundqvist, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 26 days.

(21) Appl. No.: 14/244,346

(22) Filed: Apr. 3, 2014

(65) Prior Publication Data
US 2015/0036598 A1 Feb. 5, 2015

Related U.S. Application Data

(60) Provisional application No. 61/860,789, filed on Jul. 31, 2013.

(51) Int. Cl.
*H04W 52/04* (2009.01)
*H04W 72/04* (2009.01)
(Continued)

(52) U.S. Cl.
CPC .......... *H04W 72/0473* (2013.01); *H04W 8/08* (2013.01); *H04W 36/0055* (2013.01);
(Continued)

(58) Field of Classification Search
None
See application file for complete search history.

(56) References Cited

U.S. PATENT DOCUMENTS

| 5,428,816 A | 6/1995 | Barnett et al. |
| 5,884,147 A * | 3/1999 | Reudink et al. ........... 455/67.11 |

(Continued)

FOREIGN PATENT DOCUMENTS

| EP | 1071304 A1 | 1/2001 |
| EP | 2214439 A1 | 8/2010 |

(Continued)

OTHER PUBLICATIONS

IPEA/EPO, Second Written Opinion of the International Preliminary Examining Authority, Int'l App. No. PCT/US2014/047453, Jun. 24, 2015, European Patent Office, Munich, DE, 13 pgs.

(Continued)

*Primary Examiner* — Chi H Pham
*Assistant Examiner* — Shick Hom
(74) *Attorney, Agent, or Firm* — Holland & Hart LLP

(57) ABSTRACT

Methods, systems, and devices are described for predicting a current random access transmission power detectable by a base station based on historical transmission power information. In one aspect, a mobile device may access a historical transmission power associated with a current state of the mobile device, with the historical transmission power based on mobility patterns of the mobile device. Based at least in part on the accessed historical transmission power, the mobile device may predict a current random access transmission power of the mobile device, where the predicted current random access transmission power is configured to elicit a random access response from a base station. In one aspect, the techniques described herein may reduce a number of power ramp steps taken by the mobile device during a random access procedure, reduce interference from the mobile device during the random access procedure, or both based on the predicted current random access transmission power.

30 Claims, 13 Drawing Sheets

(51) Int. Cl.

| | | |
|---|---|---|
| *H04W 36/32* | (2009.01) | |
| *H04W 36/04* | (2009.01) | |
| *H04W 36/24* | (2009.01) | |
| *H04W 64/00* | (2009.01) | |
| *H04W 72/02* | (2009.01) | |
| *H04W 8/08* | (2009.01) | |
| *H04W 68/02* | (2009.01) | |
| *H04W 36/00* | (2009.01) | |
| *H04W 36/10* | (2009.01) | |
| *H04W 52/22* | (2009.01) | |
| *H04W 74/08* | (2009.01) | |
| *H04W 52/50* | (2009.01) | |
| *H04W 52/32* | (2009.01) | |
| *H04W 60/00* | (2009.01) | |
| *H04W 52/28* | (2009.01) | |
| *H04W 52/36* | (2009.01) | |

(52) U.S. Cl.
CPC ............ *H04W36/04* (2013.01); *H04W 36/10* (2013.01); *H04W 36/245* (2013.01); *H04W 36/32* (2013.01); *H04W 52/22* (2013.01); *H04W 52/50* (2013.01); *H04W 64/006* (2013.01); *H04W 68/02* (2013.01); *H04W 72/02* (2013.01); *H04W 72/048* (2013.01); *H04W 74/0833* (2013.01); *H04W 52/223* (2013.01); *H04W 52/228* (2013.01); *H04W 52/285* (2013.01); *H04W 52/325* (2013.01); *H04W 52/362* (2013.01); *H04W 60/00* (2013.01)

(56) References Cited

U.S. PATENT DOCUMENTS

| | | | |
|---|---|---|---|
| 6,909,893 | B2 | 6/2005 | Aoki et al. |
| 7,224,973 | B2 | 5/2007 | Tsutazawa et al. |
| 7,912,490 | B2 | 3/2011 | Pietraski |
| 7,925,205 | B2 | 4/2011 | Kennedy, Jr. et al. |
| 7,929,979 | B2 | 4/2011 | Konno |
| 8,121,784 | B2 | 2/2012 | Templeton et al. |
| 8,134,970 | B2 | 3/2012 | Jalil et al. |
| 8,175,598 | B2 | 5/2012 | Kubo et al. |
| 8,185,057 | B2 | 5/2012 | Molnar et al. |
| 8,185,159 | B2 | 5/2012 | Itamiya et al. |
| 8,208,473 | B2 | 6/2012 | Larsen et al. |
| 8,331,929 | B2 | 12/2012 | Brisebois et al. |
| 8,345,632 | B2 | 1/2013 | Mildh et al. |
| 8,472,982 | B1 | 6/2013 | Oroskar et al. |
| 8,537,751 | B2 | 9/2013 | Nylander et al. |
| 8,712,443 | B2 | 4/2014 | Konno |
| 9,008,063 | B2 | 4/2015 | Cui et al. |
| 9,084,181 | B2 | 7/2015 | Brisebois |
| 9,198,160 | B2 | 11/2015 | Bienas et al. |
| 9,226,197 | B2 | 12/2015 | Cui et al. |
| 2001/0006514 | A1 | 7/2001 | Park |
| 2004/0017310 | A1 | 1/2004 | Vargas-Hurlston et al. |
| 2004/0085909 | A1 | 5/2004 | Soliman |
| 2004/0192341 | A1 | 9/2004 | Wang et al. |
| 2005/0255870 | A1 | 11/2005 | Chang et al. |
| 2005/0277415 | A1 | 12/2005 | Hamalainen et al. |
| 2005/0288019 | A1 | 12/2005 | Park et al. |
| 2006/0039318 | A1 | 2/2006 | Oh et al. |
| 2006/0227744 | A1 | 10/2006 | Metke et al. |
| 2007/0140157 | A1* | 6/2007 | Fu et al. ........................ 370/318 |
| 2007/0142050 | A1 | 6/2007 | Handforth et al. |
| 2007/0149235 | A1 | 6/2007 | Chin et al. |
| 2008/0119209 | A1 | 5/2008 | Upp |
| 2008/0220784 | A1 | 9/2008 | Somasundaram et al. |
| 2008/0240030 | A1 | 10/2008 | Kolding et al. |
| 2009/0131066 | A1 | 5/2009 | Barve et al. |
| 2009/0268689 | A1 | 10/2009 | Fu et al. |
| 2009/0318199 | A1 | 12/2009 | Barreto et al. |
| 2010/0057485 | A1 | 3/2010 | Luft |
| 2010/0081455 | A1 | 4/2010 | Teasdale et al. |
| 2010/0267378 | A1 | 10/2010 | Hamabe et al. |
| 2010/0272050 | A1 | 10/2010 | Lim et al. |
| 2011/0124334 | A1 | 5/2011 | Brisebois et al. |
| 2011/0177819 | A1 | 7/2011 | Kitahara |
| 2011/0223965 | A1 | 9/2011 | Miklos et al. |
| 2011/0244859 | A1 | 10/2011 | Tsuda |
| 2012/0039305 | A1 | 2/2012 | Han et al. |
| 2012/0071173 | A1 | 3/2012 | Olsson et al. |
| 2012/0076056 | A1 | 3/2012 | Tillman et al. |
| 2012/0082198 | A1 | 4/2012 | Zhang et al. |
| 2012/0282925 | A1 | 11/2012 | Wehmeier et al. |
| 2012/0328059 | A1 | 12/2012 | Balraj et al. |
| 2013/0012189 | A1 | 1/2013 | Hamabe et al. |
| 2013/0030873 | A1 | 1/2013 | Davidson |
| 2013/0039194 | A1* | 2/2013 | Siomina et al. ............... 370/252 |
| 2013/0079010 | A1 | 3/2013 | Brisebois et al. |
| 2013/0107782 | A1 | 5/2013 | Anas et al. |
| 2013/0115998 | A1 | 5/2013 | Lamm et al. |
| 2013/0143617 | A1 | 6/2013 | Cea et al. |
| 2013/0155889 | A1 | 6/2013 | Brownworth et al. |
| 2013/0165120 | A1 | 6/2013 | Nylander et al. |
| 2013/0183971 | A1 | 7/2013 | Tamaki et al. |
| 2013/0195005 | A1 | 8/2013 | Al-Shalash |
| 2013/0222515 | A1 | 8/2013 | Abuan et al. |
| 2013/0225169 | A1 | 8/2013 | Farnsworth et al. |
| 2013/0231115 | A1 | 9/2013 | Lin |
| 2013/0231116 | A1 | 9/2013 | Mildh et al. |
| 2013/0237233 | A1 | 9/2013 | Radulescu et al. |
| 2013/0260745 | A1 | 10/2013 | Johansson et al. |
| 2013/0272268 | A1 | 10/2013 | Xu et al. |
| 2013/0288682 | A1 | 10/2013 | Wang et al. |
| 2013/0294380 | A1 | 11/2013 | Gazzard |
| 2013/0315094 | A1* | 11/2013 | Vannithamby et al. ....... 370/252 |
| 2013/0316706 | A1 | 11/2013 | Knauft |
| 2014/0057644 | A1 | 2/2014 | Chetlur et al. |
| 2014/0073303 | A1 | 3/2014 | Henderson et al. |
| 2014/0094178 | A1 | 4/2014 | Eskicioglu et al. |
| 2014/0148174 | A1 | 5/2014 | Teyeb et al. |
| 2014/0226559 | A1 | 8/2014 | Jactat et al. |
| 2015/0036663 | A1 | 2/2015 | Kilpatrick, II et al. |
| 2015/0038140 | A1 | 2/2015 | Kilpatrick, II et al. |
| 2015/0038143 | A1 | 2/2015 | Kilpatrick, II et al. |
| 2015/0038156 | A1 | 2/2015 | Kilpatrick, II et al. |
| 2015/0038180 | A1 | 2/2015 | Quick, Jr. et al. |
| 2015/0066557 | A1 | 3/2015 | Lichti |
| 2015/0163639 | A1 | 6/2015 | Kilpatrick, II et al. |
| 2015/0264534 | A1 | 9/2015 | Liu et al. |
| 2015/0289110 | A1 | 10/2015 | Kilpatrick, II et al. |
| 2015/0304891 | A1 | 10/2015 | Dinan |

FOREIGN PATENT DOCUMENTS

| | | |
|---|---|---|
| EP | 2320694 A1 | 5/2011 |
| EP | 2320702 A1 | 5/2011 |
| EP | 2525605 A1 | 11/2012 |
| EP | 2750457 A1 | 7/2014 |
| GB | 2449228 A | 11/2008 |
| GB | 2472595 A | 2/2011 |
| GB | 2472791 A | 2/2011 |
| WO | WO-9955110 A2 | 10/1999 |
| WO | WO-0033478 A1 | 6/2000 |
| WO | WO-2005064969 A1 | 7/2005 |
| WO | WO-2013029396 A1 | 3/2013 |
| WO | WO-2013050067 A1 | 4/2013 |
| WO | WO-2013107042 A1 | 7/2013 |
| WO | WO-2014012568 A1 | 1/2014 |

OTHER PUBLICATIONS

Chandra et al., "Determination of Optimal Handover Boundaries in a Cellular Network Based on Traffic Distribution Analysis of Mobile Measurement Reports," 1997 IEEE 47th Vehicular Technology Conference, May 4-7, 1997, Phoenix, AZ, pp. 305-309, vol. 1, ISBN 0-7803-3659-3, Institute of Electrical and Electronics Engineers.

(56) References Cited

OTHER PUBLICATIONS

Lyberopoulos et al., "Intelligent Paging Strategies for Third Generation Mobile Telecommunication Systems," IEEE Transactions on Vehicular Technology, Aug. 1995, pp. 543-554, vol. 44, issue 3, ISSN 0018-9545, Institute of Electrical and Electronics Engineers.
ISA/EPO, International Search Report and Written Opinion of the International Searching Authority, Int'l App. No. PCT/US2014/047453, Nov. 3, 2014, European Patent Office, Rijswijk, NL, 16 pgs.
Becvar et al., "Improvement of Handover Prediction in Mobile WiMAX by Using Two Thresholds," Computer Networks, vol. 55, No. 16, Nov. 2011, pp. 3759-3773, Elsevier B.V.
Jeong et al., "A Smart Handover Decision Algorithm Using Location Prediction for Hierarchical Macro/Femto-Cell Networks," 2011 IEEE Vehicular Technology Conference (VTC Fall), San Francisco, CA, Sep. 5-8, 2011, 5 pgs., ISBN: 978-1-4244-8327-3, Institute of Electrical and Electronics Engineers.

* cited by examiner

RANDOM ACCESS USING PREDICTIVE MOBILITY

CROSS REFERENCES

The present application for patent claims priority to U.S. Provisional Patent Application No. 61/860,789 by Kilpatrick II et al., entitled "PREDICTIVE MOBILITY IN CELLULAR NETWORKS," filed on Jul. 31, 2013, the entire disclosure of which is incorporated herein by reference for all purposes.

BACKGROUND

The present description relates generally to wireless communication, and more specifically to adapting the behavior of mobile devices based on observed mobility trends. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, space and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links. Each base station has a coverage range, which may be referred to as the coverage area of the cell.

In Long Term Evolution (LTE) and other systems, a mobile device or user equipment (UE) may transmit a random access (RA) preamble, such as over a random access channel (RACH), to establish a connection with a base station or eNodeB (eNB). The mobile device may initially transmit the RACH preamble at a power level determined by a downlink path loss and transmit power (e.g., a standard value). The mobile device may increase the RACH transmission power until the base station responds. This process of increasing RACH transmission power by the mobile device until the base station responds can be inefficient and can introduce unnecessary delay into connection establishment processes. During this ramp-up time, the mobile device may also provide substantial interference to other nearby devices, such as devices served by the same cell.

SUMMARY

The described features generally relate to one or more improved systems, methods, and/or apparatuses for predicting a current random access (RA) transmission power detectable by a base station based on historical transmission power information. In one aspect, a mobile device may access historical transmission power information that is associated with a current state of the mobile device and based on mobility patterns of the mobile device. The mobility pattern(s) may include a time value associated with a geographic location, a current cell identification (ID), or at least one other cell ID in a known physical route of the mobile device, a physical route containing multiple geographic locations previously traveled by the mobile device or another mobile device, etc. Based at least in part on the accessed historical transmission power, the mobile device may predict a current random access transmission power configured to elicit a random access response from a selected or target base station. In one aspect, the predicted current random access transmission power may include a random access channel (RACH) preamble transmission power. The mobile device may transmit a RACH preamble using the predicted current random access transmission power to elicit a response from the target base station.

According to one aspect, a method for wireless communication may include accessing a historical transmission power associated with a current state of a mobile device, the historical transmission power based on mobility patterns of the mobile device; and predicting a current random access transmission power of the mobile device based at least in part on the accessed historical transmission power, the predicted current random access transmission power configured to elicit a random access response from a base station.

In certain examples, the current random access transmission power may include a RACH preamble transmission power. The RACH preamble may be transmitted using the predicted current random access transmission power.

In certain examples, the random access response elicited from the base station may include a random access radio network temporary identifier (RA-RNTI) message. In some embodiments, in response to receiving the RA-RNTI message from the first base station, the described methods may include transmitting messaging on an Uplink Shared Channel (UL-SCH) to the base station.

In certain examples, a number of power ramp steps taken by the mobile device during a random access procedure may be reduced based on the predicted current random access transmission power. In certain examples, interference from the mobile device during a random access procedure may be reduced based on the predicted current random access transmission power.

In certain examples, the mobility patterns of the mobile device may include at least one of a time value associated with at least one geographic location, a current cell identification (ID), or at least one other cell ID in a known physical route of the mobile device.

In certain examples, the historical transmission power may include an amount of transmission power associated with receiving a past random access response associated with at least one of the time value associated with the geographic location, the current cell ID, or at least one other cell ID in the known physical route of the mobile device.

In certain examples, the mobility patterns of the mobile device may include a physical route previously traveled by the mobile device or another mobile device. In some embodiments, the described methods may also include recognizing that the mobile device is currently traveling along the physical route and predicting the current random access transmission power of the mobile device based at least in part on the recognition.

In certain examples, the described methods may include ramping the predicted current random access transmission power up to a second random access transmission power, with the second random access transmission power eliciting a random access response from the base station. The described methods may further include storing the second random access transmission power as a new historical transmission power associated with the mobility patterns of the mobile device.

In another aspect, a wireless communications apparatus may include a processor and a memory in electronic communication with the processor. The memory may embody instructions being executable by the processor to access a historical transmission power associated with a current state of a mobile device, with the historical transmission power based on mobility patterns of the mobile device. The instructions may further enable the processor to predict a current random access transmission power of the mobile device based at least in part on the accessed historical transmission power, with the predicted current random access transmission power configured to elicit a random access response from a base station.

In certain examples, the mobility patterns of the mobile device may include at least one of a time value associated with at least one geographic location, a current cell identification (ID), or at least one other cell ID in a known physical route of the mobile device. Additionally or alternatively, the mobility patterns of the mobile device may include a physical route previously traveled by the mobile device or another mobile device. In some embodiments, the instructions may further enable the processor to recognize that the mobile device is currently traveling along the physical route and predict the current random access transmission power of the mobile device based at least in part on the recognition.

In certain examples, the current random access transmission power may include a random access channel (RACH) preamble transmission power. In some cases, the instructions may enable the processor to transmit a RACH preamble using the predicted current random access transmission power.

In certain examples, the instructions may enable the processor to reduce a number of power ramp steps taken by the mobile device during a random access procedure based on the predicted current random access transmission power. The instructions may further enable the processor to reduce interference from the mobile device during a random access procedure based on the predicted current random access transmission power.

In certain examples, the instructions may enable the processor to ramp the predicted current random access transmission power up to a second random access transmission power, with the second random access transmission power eliciting a random access response from the base station. The instructions may further enable the processor to store the second random access transmission power as a new historical transmission power associated with the mobility patterns of the mobile device.

In another aspect, a mobile device may include means for accessing a historical transmission power associated with a current state of the mobile device, with the historical transmission power based on mobility patterns of the mobile device. The mobile device may also include means for predicting a current random access transmission power to be used by the mobile device based at least in part on the accessed historical transmission power, with the predicted current random access transmission power configured to elicit a random access response from a base station.

In certain examples, the mobility patterns of the mobile device may include at least one of a time value associated with at least one geographic location, a current cell identification (ID), or at least one other cell ID in a known physical route of the mobile device. Additionally or alternatively, the mobility patterns of the mobile device may include a physical route previously traveled by the mobile device or another mobile device. In some embodiments, the mobile device may also include means for recognizing that the mobile device is currently traveling along the physical route. The means for predicting the current random access transmission power of the mobile device may predict the current random access transmission power based at least in part on the recognition.

In certain examples, the current random access transmission power may include a random access channel (RACH) preamble transmission power. The mobile device may further include means for transmitting a RACH preamble using the predicted current random access transmission power.

In certain examples, the mobile device may include means for reducing a number of power ramp steps taken by the mobile device during a random access procedure based on the predicted current random access transmission power. In some embodiments, the mobile device may include means for reducing interference from the mobile device during a random access procedure based on the predicted current random access transmission power.

In another aspect, a computer program product for predicting a current random access transmission power may include a non-transitory computer-readable storage medium including instructions executable by a processor to access a historical transmission power associated with a current state of the mobile device, with the historical transmission power based on mobility patterns of the mobile device. The non-transitory computer-readable storage medium may include instructions executable by the processor to predict the current random access transmission power of the mobile device based at least in part on the accessed historical transmission power, with the predicted current random access transmission power configured to elicit a random access response from a base station.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
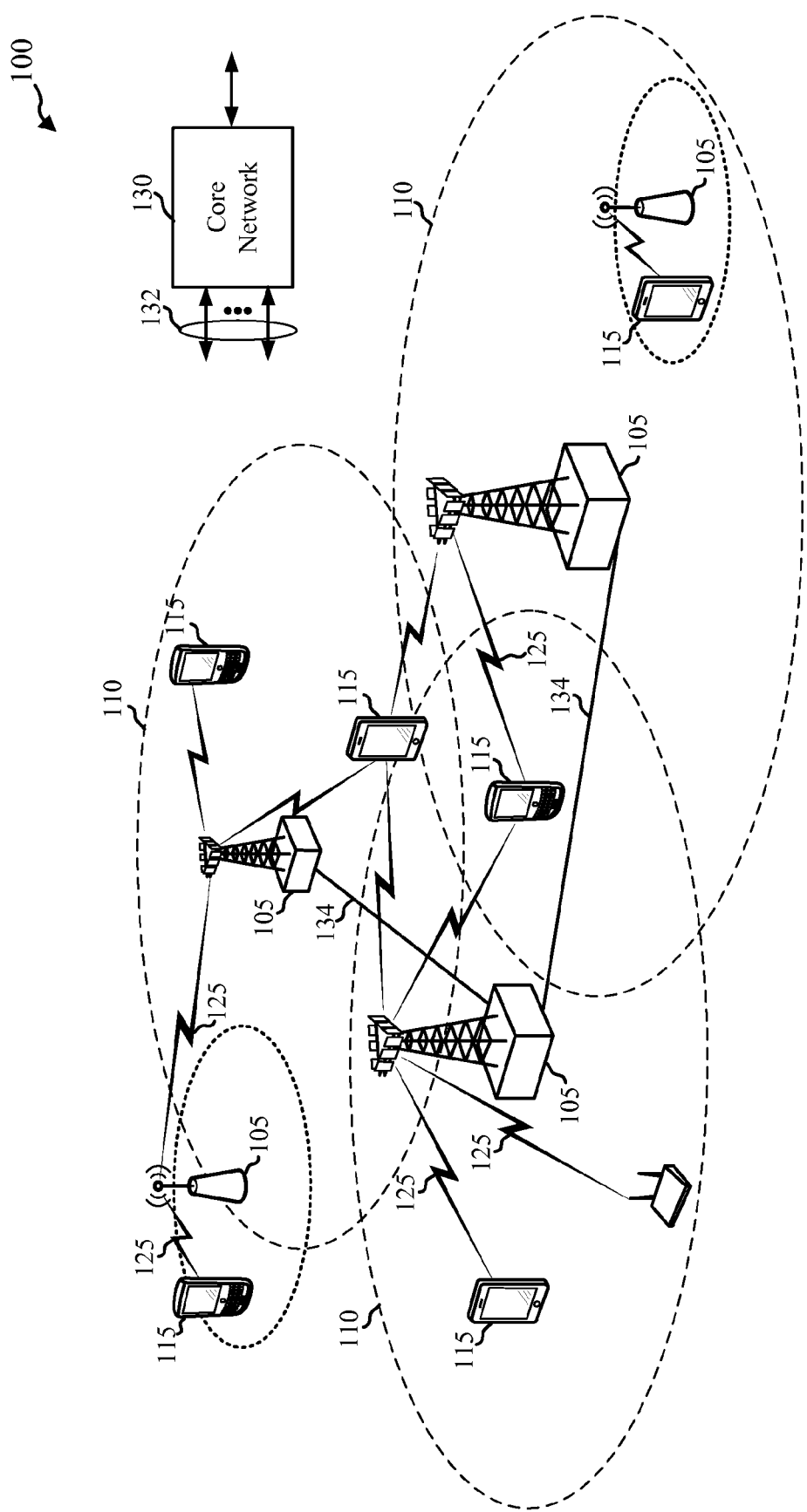
FIG. 1 shows a block diagram of a wireless communications system, according to one aspect of the principles described herein.

The described features generally relate to one or more improved systems, methods, and/or apparatuses for predicting a current random access transmission power detectable by a base station based on historical transmission power information. The described techniques may allow a mobile device to use historical information related to transmission power levels utilized by a mobile device at one or more known locations to predict a transmission power most likely to be detected and responded to by a base station. The described techniques may be particularly useful for mobile stations or user equipments (UEs) engaging in a random access procedure to connect with a base station (e.g., an eNB).

In one aspect, a mobile device may access historical transmission power information that is associated with a current state of the mobile device based on mobility patterns of the mobile device. The mobility pattern(s) may include a time value, e.g., time of day, time relative to the beginning of a known physical route, time relative to other standards, clocks, etc., associated with a geographic location, a physical route containing multiple geographic locations previously traveled by the mobile device or another mobile device, etc. The historical transmission power information may include an amount of transmission power associated with receiving a past random access response from a base station at the or a similar time value and geographic location of the current mobile device.

Based at least in part on the accessed historical transmission power, the mobile device may predict a current random access transmission power of the mobile device configured to elicit a random access response from a base station. In one aspect, based on one more location and time values associated with the historic transmission power information, a current random access transmission power may be approximated for a nearby location and/or time value of the current mobile device. In one aspect, the mobile device may recognize that it is traveling along a physical route associated with historical transmission power information. In this scenario, the mobile device may predict a current random access transmission power based on the recognition that the mobile device is traveling along a previously traveled physical route with historical transmission power information that is accessible to the mobile device.

In one aspect, the predicted current random access transmission power may include a RACH or Physical RACH (PRACH) preamble transmission power. As used herein, the term RACH may generally refer to a random access channel on the physical layer (PRACH), or a random access channel on another layer. The mobile device may transmit a RACH preamble using the predicted current random access transmission power to elicit a response from a target base station. The mobile device may then wait for a period of time, such as a random access window plus a backoff time, to receive a response message from the target base station until retransmitting at a higher power level. The mobile device may continue ramping up the transmission power in a similar manner until a response is received. The mobile device may store the transmission power corresponding to receiving a response from the base station as a new historical transmission power associated with the mobility patterns of the mobile device. In this way, the accuracy of historical transmission power information may be improved to enable the current and other mobile devices to more accurately predict a random access transmission power detectable by a target base station.

By using historical information of the transmission power levels, which have previously enabled detection of the mobile device, for example in a similar physical location and at a similar time of day, the number of transmissions by the mobile device to be detected may be reduced. For example, if a detectable transmission power is much higher than the standard or configured starting transmit power, the historical data may be used to adjust the starting transmit power to be closer in value to the detectable power level. This may decrease delay associated with base station detection of the mobile device, e.g. less power increasing or ramping steps and less preamble re-transmissions, and may decrease interference caused by multiple transmissions at progressively higher power levels by the mobile device.

Thus, the following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

FIG. 1 is a block diagram conceptually illustrating an example of a wireless communications system 100, in accordance with an aspect of the present disclosure. The wireless communications system 100 includes base stations (or cells) 105, mobile devices 115, and a core network 130. The base stations 105 may communicate with the mobile devices 115 under the control of a base station controller (not shown), which may be part of the core network 130 or the base stations 105 in various examples. Base stations 105 may communicate control information and/or user data with the core network 130 through backhaul links 132. In certain examples, the base stations 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the mobile devices 115 via one or more base station antennas. Each of the base stations 105 sites may provide communication coverage for a respective coverage area 110. In some examples, base stations 105 may be referred to as a base transceiver station, a radio base station, an access point, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include base stations 105 of different types (e.g., macro, micro, and/or pico base stations). There may be overlapping coverage areas for different technologies.

In certain examples, the wireless communications system 100 is an LTE/LTE-A network communication system. In LTE/LTE-A network communication systems, the terms evolved Node B (eNodeB) may be generally used to describe the base stations 105. The wireless communications system 100 may be a Heterogeneous LTE/LTE-A network in which different types of eNodeBs provide coverage for various geographical regions. For example, each base station 105 may provide communication coverage for a macro cell, a pico cell, a femto cell, and/or other types of cell. A macro cell generally covers a relatively large coverage area (e.g., several kilometers in radius) and may allow unrestricted access by mobile devices 115 with service subscriptions with the network provider. A pico cell would generally cover a relatively smaller coverage area (e.g., buildings) and may allow unrestricted access by mobile devices 115 with service subscriptions with the network provider. A femto cell would also generally cover a relatively small coverage area (e.g., a home) and, in addition to unrestricted access, may also provide restricted access by mobile devices 115 having an association with the femto cell (e.g., mobile devices 115 in a closed subscriber group (CSG), mobile devices 115 for users in the home, and the like). A base station 105 for a macro cell may be referred to as a macro eNodeB. A base station 105 for a pico cell may be referred to as a pico eNodeB. And, a base station 105 for a femto cell may be referred to as a femto eNodeB or a home eNodeB. A base station 105 may support one or multiple (e.g., two, three, four, and the like) cells.

The core network 130 may communicate with the base stations 105 via a backhaul link 132 (e.g., an S1 interface, etc.). The base stations 105 may also communicate with one another, e.g., directly or indirectly via backhaul links 134 (e.g., an X2 interface, etc.) and/or via backhaul links 132 (e.g., through core network 130). The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The mobile devices 115 may be dispersed throughout the wireless communications system 100, and each mobile device 115 may be stationary or mobile. A mobile device 115 may also be referred to by those skilled in the art as a UE, mobile station, a subscriber station, a mobile unit, a subscriber unit, a wireless unit, a remote unit, a mobile device, a wireless communications device, a remote device, a mobile subscriber station, an access terminal, a mobile terminal, a wireless terminal, a remote terminal, a handset, a user agent, a mobile client, a client, or some other suitable terminology. A mobile device 115 may be a cellular phone, a personal digital assistant (PDA), a wireless modem, a wireless communication device, a handheld device, a tablet computer, a laptop computer, a cordless phone, a wireless local loop (WLL) station, or the like.

The communication links 125 shown in the wireless communications system 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions.

Mobile device 115 users typically have predictable behavior, often doing the same things or going to the same places at about the same time each day. One example is the travel pattern and schedule of a mobile device 115 user, or of multiple mobile device 115 users, going to and from work and/or traveling on the same roads, highways, etc. A user may typically leave home at a certain time, travel certain roads to get to work, stay at work until it is time to go back home using the same roads as before, and then repeat more or less the same routine the next day. Because the movements of the mobile device 115 user in such a scenario can be foreseeable, it may be possible to predict a random access transmission power level that will be detectable by a nearby base station 105 based on historical power information associated with a current state of the mobile device 115 and based on the mobility patterns of the mobile device 115. The historical power information may include a power level that was detectable by a target base station 105 associated with the current location, time, and/or physical route of the mobile device 115. Alternatively or additionally, the historical power information may include one or more power levels that were detectable by a target base station 105 associated with one or more locations, times, and/or physical routes in close proximity to the current location, time, and or physical route of the mobile device 115. Moreover, the use of historical power information may also apply to other devices such as laptops, tablets, pads, machine-to-machine (M2M) devices, and the like.

Predicting a current random access transmission power based on mobility patterns of a mobile device 115, and particularly historical transmission power information associated with the current state of a mobile device 115 based on the mobility patterns, may reduce a number of power ramp steps taken by the mobile device 115 during a random access procedure. Additionally or attentively, the techniques described herein may also reduce interference from the mobile device 115 during a random access procedure based by reducing the number of transmission required to elicit a response from a target base station 105.

In particular, a mobile device 115 may use historical transmission power information associated with a current state, e.g., a time, place, route, etc. of a mobile device 115 to better predict a random access transmission power that will be detectable by a base station 105.

Figure 2A:
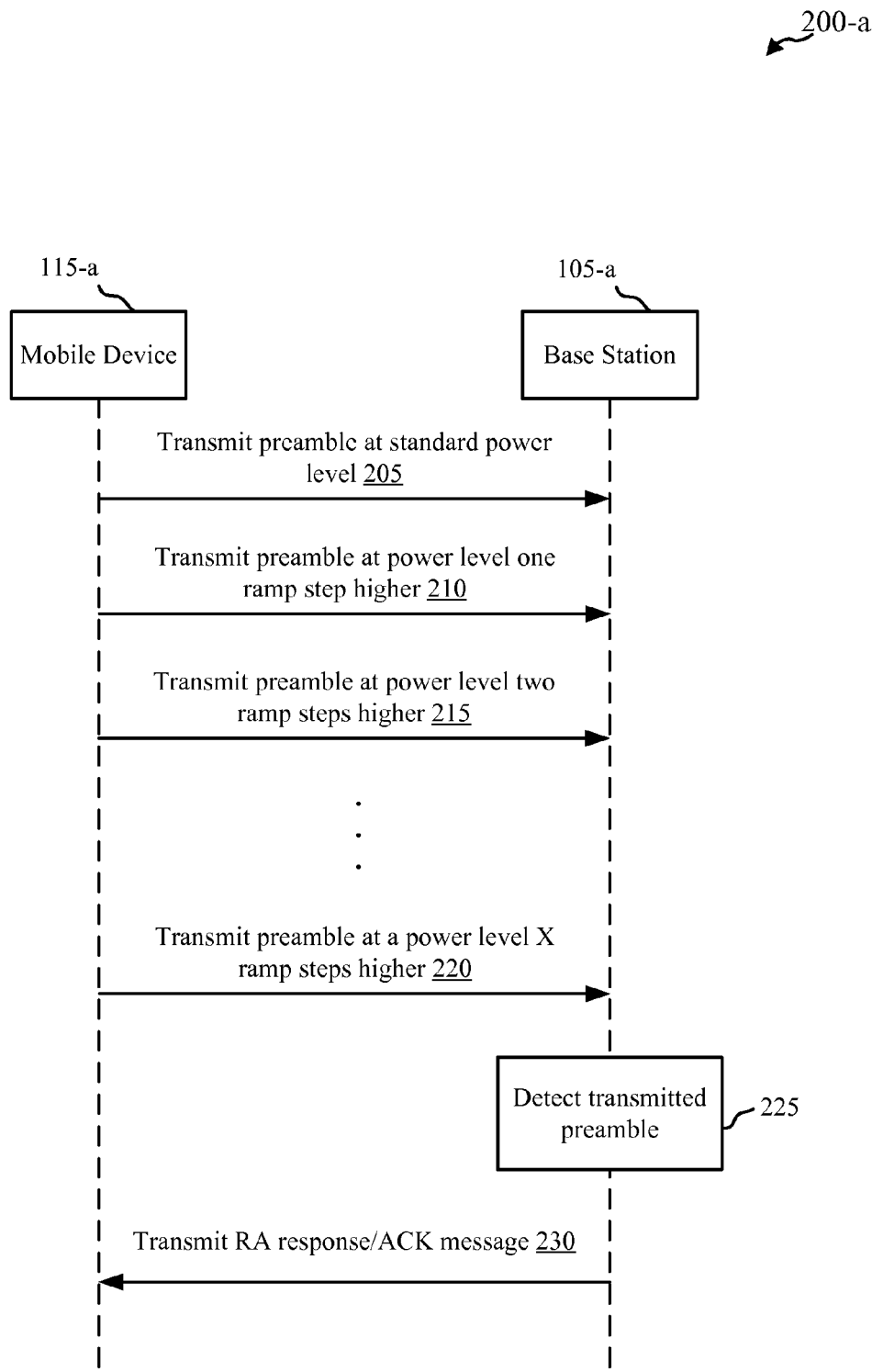
FIG. 2A shows example communications between a mobile device and a base station for a random access procedure, according to one aspect of the principles described herein.
Figure 2B:
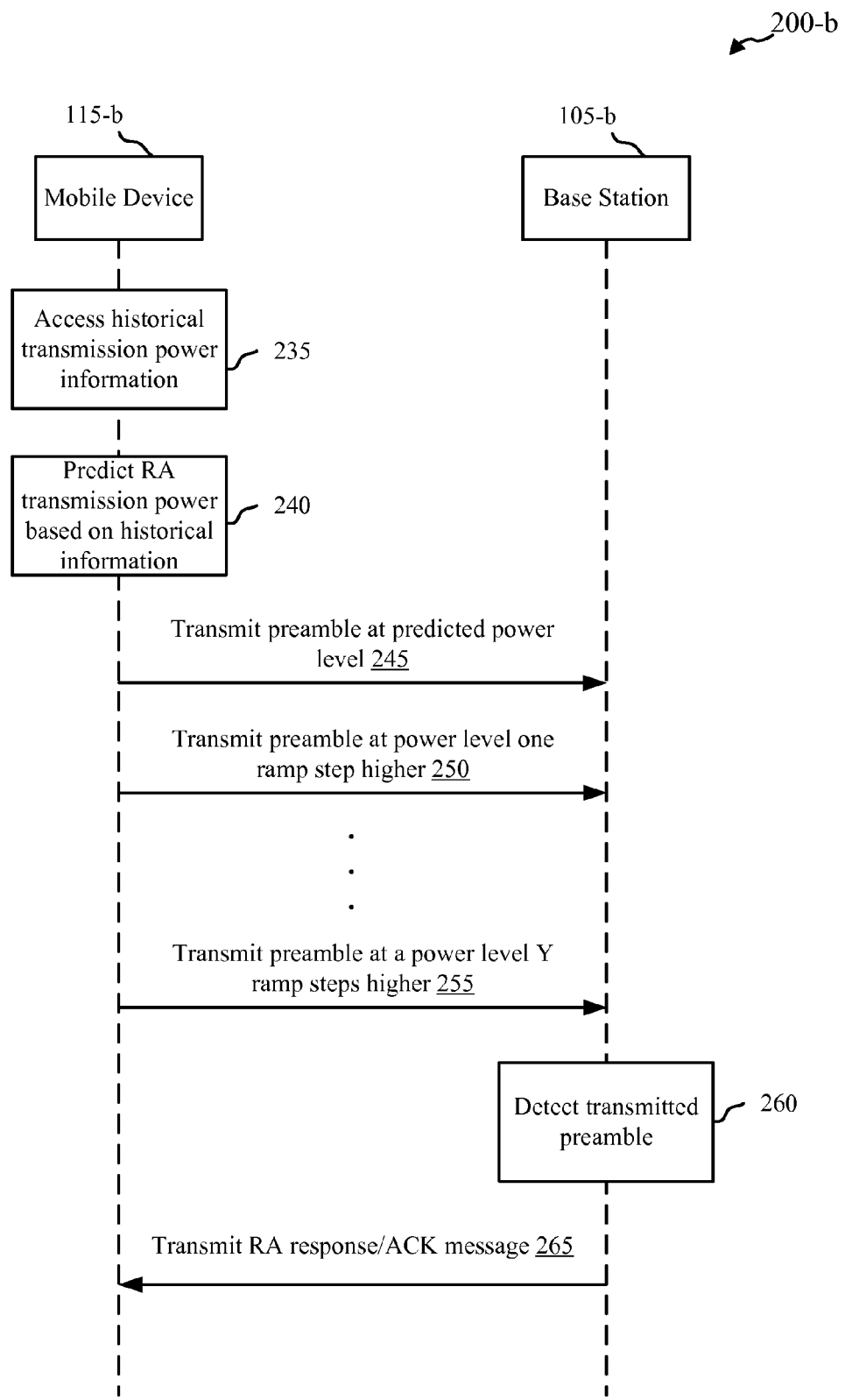
FIG. 2B shows another example of communications between a mobile device and a base station for a random access procedure, according to one aspect of the principles described herein.

In reference to FIGS. 2A and 2B, wireless communications systems 200-a and 200-b and related processes for predicting a random access transmission power are shown. Each of the wireless communications systems 200-a, 200-b may include a mobile device 115-a, 115-b in communication with a base station 105-a, 105-b. The wireless communications systems 200-a, 200-b may each be an example of or part of the wireless communications system 100 described in reference to FIG. 1 above. Similarly, the mobile devices 115-a, 115-b and the base stations 105-a, 105-b of FIGS. 2A and 2B may be examples of respective ones of the mobile devices 115 and base stations 105 described in reference to FIG. 1. The mobile device 115-a, 115-b may be configured for predicting a current random access transmission power that will elicit a random access response from the base station 105-a, 105-b based at least in part on the accessed historical transmission power, in accordance with the techniques described above.

With specific reference to the wireless communications system 200-a of FIG. 2A, a communication scheme is shown for eliciting a random access response from the base station 105-a by a mobile device 115-a. The mobile device 115-a may initiate a random access procedure with the base station 105-a by transmitting a random access preamble, such as a RACH or Physical RACH preamble, at a standard power level 205. The mobile device 115-a may receive the appropriate preamble sequence from the target base station 105-a, another base station 105, or may determine the sequence on its own. The standard power level may be based on metrics such as downlink path loss, a standard transmit power implemented in a wireless communication network, such as wireless communications system 100, etc. The mobile device 115-a, after not receiving a response message from the base station 105-a for a certain time period, may transmit the same preamble sequence at a power level one ramp step higher 210, and again at a power level two ramp steps higher 215. The mobile device 115-a may continue to transmit the preamble sequence at progressively higher ramp steps until a power level X ramp steps higher than the standard power level 220, is detected by the base station 105-a at 225.

After detecting the transmitted preamble sequence 225, the base station 105-a may then transmit a random access response message or acknowledgement (ACK) message 230 to the mobile device 115-a. The random access response message may enable the mobile device 115-a to establish a communication link with the base station 105-a. As is well known in the art, the mobile device 115-a may then begin transmitting to the base station 105-a via an uplink channel, such as via an Uplink Shared Channel (UL-SCH) for example.

With specific reference now to the wireless communications system 200-b of FIG. 2B, a communication scheme is shown for eliciting a random access response from a base station 105-b by a mobile device 115-b by predicting a current random access transmission power based on historical transmission power information. The mobile device 115-b may first access historical transmission power information 235. The mobile device 115-b may determine a current state, such as a location, and/or time, and/or a mobility pattern, such as a physical route of the mobile device 115-b and access relevant historical transmission power information by searching for historical power information associated with the current state and/or mobility pattern of the mobile device 115-b. Based on the historical transmission power information, the mobile device 115-b may predict a current random access transmission power 240.

The mobile device 115-b may then initiate the random access procedure by transmitting the preamble sequence at the predicted current random access transmission power 245. The mobile device 115-b may ramp up the transmission power level and transmit the preamble again 250. The mobile device 115-b may continue to ramp up the transmit power level until a power level Y ramp steps above the predicted power level and transmit the preamble 255 until the base station 105-b detects the preamble 260. The base station may then transmit a random access response/ACK message 265 to enable a communication link to be established between the mobile device 115-b and the base station 105-b.

By initiating the random access procedure at the predicted current random access transmission power level based on historical transmission power information, the mobile device 115-b may reduce the number of ramps steps Y to elicit a response from the base station 105-b. That is, the number or ramp steps Y in FIG. 2B may be fewer than the number of ramp steps X to elicit a response from base station 105-a as described in reference to FIG. 2A. This may reduce the time to establish the communication link between the mobile device 115-b and the base station 105-b, and may reduce interference caused by the random access procedure by limiting the number of times the preamble is transmitted by the mobile device 115-b, e.g., Y ramp steps instead of X ramp steps.

Figure 3:
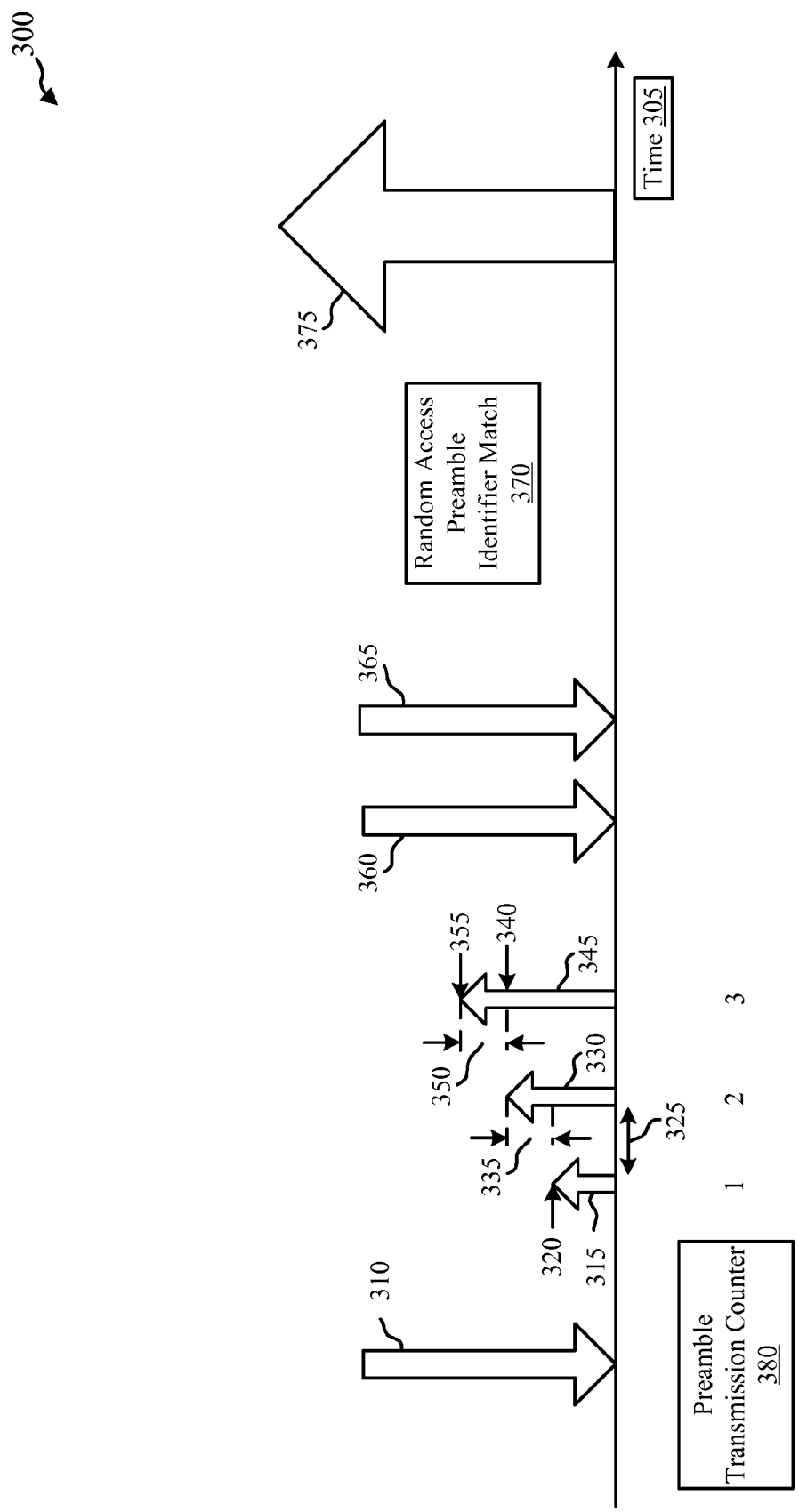
FIG. 3 shows a diagram of an example of a mobile device transmitting a preamble at increasing transmission power levels to elicit a response from a base station, according to one aspect of the principles described herein.

In reference to FIG. 3, wireless communications systems 300 and related processes for predicting random access transmission power are shown. The wireless communications system 300 may represent communications between a mobile device 115 and a base station 105. The wireless communications system 300 may be an example of or part of one or more of the wireless communications systems 100, 200-a, and/or 200-b and/or may be implemented by any of the mobile devices 115 and the base stations 105 described in reference to FIGS. 1, 2A, and 2B above. The wireless communications system 300 illustrates techniques for predicting a current random access transmission power that will elicit a random access response from a base station 105 based at least in part on the accessed historical transmission power, in accordance with the techniques described above, relative to time 305.

A base station 105 may first send a preamble sequence and a resource identification (ID) 310, such as a RACH or Physical Random Access Channel (PRACH) ID, to a passing mobile device 115 to begin connection establishment. Alternatively, the mobile device 115 may determine the preamble sequence and/or PRACH resource ID on its own. To establish a link with the base station 105, the mobile device 115 may transmit an initial RACH preamble 315 at a first power level 320. The mobile device 115 may wait for a period 325, which may include a random access window in combination with a backoff time, and then re-transmit the RACH preamble 330 at a second power level 340 determined by a power ramp step 335 from the initial transmission power level 320. The mobile device 115 may then transmit the RACH preamble a third time 345, at a power level 355 ramped up a power level 350 from the previous transmission power level 340. In some cases, power ramp steps 335 and 350 or values may be equal. In other cases, the power ramp steps 335 and 350 may be different, such that each subsequent ramp step may increase or decrease based on path conditions, previous number of ramp steps implemented, local interference, etc. In the example shown in FIG. 3, the RACH preamble is transmitted three times, as indicated by the preamble transmission counter 380, at three different power levels 320, 340, 355 before eliciting response messages 360 and 365 from the base station 105. Three total RACH preamble transmissions is only given as an example; other numbers of transmissions, such as higher numbers, may be necessary to elicit a response message from the base station 105 in other circumstances, locations, etc.

The first response message 360 from the base station 105 may be over a Physical Downlink Control Channel (PDCCH) and may utilize Random Access Radio Network Temporary Identifier (RA-RNTI) messaging, as is known in the art. The second response message 365, which may be transmitted contemporaneously or shortly thereafter as the first response message 360, may be over a Physical Downlink Shared Channel (PDSCH) and may include a Re-Auth-Request (RAR) message. The RAR message may further include the preamble ID, a timing advance (TA) value, an uplink grant value, and/or a temporary C-RNTI value to aid in establishing the communication link between the mobile device 115 and the base station 105.

Based on the information contained in the response message(s) 360, 365, the mobile device 115 may identify a random access preamble match 370. The mobile device 115 may then transmit uplink data to the base station 105 375, for example over an UL-SCH, or the like.

As previously discussed, in the example shown in FIG. 3, three transmissions (i.e., 315, 330, and 345) are made to elicit a random access response from the base station 105. In some cases, power level 320 may represent a standard transmission power value. Accordingly, by predicting a current random access transmission power that will elicit a response from the base station 105 based on historical transmission power information, the value of the preamble transmission counter 380 may be reduced. This may be accomplished by accessing historical transmission power information associate with or approximating a current state and/or mobility pattern of the mobile device 115. This may enable the mobile device 115 to initially transmit the RACH preamble at a power level 335 and/or even at power level 355, to reduce the number of power ramp steps, and hence time and interference, before eliciting a response from the base station 105. It should be appreciated that, based on the historical transmission power information, any power level greater than power level 320 may provide some or all of the advantages described herein.

In some cases, power level 320 may represent a current predicted transmission power level, such that the preamble transmission counter 380 would have been greater than three if not for the mobile device 115 initially transmitting the RACH preamble 315 at the predicted power level 320. In this case, by using the predicted random access transmission power level 320, interference, time, and/or number of ramp steps may be reduced. It should be appreciated, that depending on the historical transmission power information available, and possible interference caused to nearby communications and/or systems, it may be beneficial to start at a lower transmission power level 320 than the historical transmission power information to reduce impact to the neighboring devices and systems.

Figure 4:
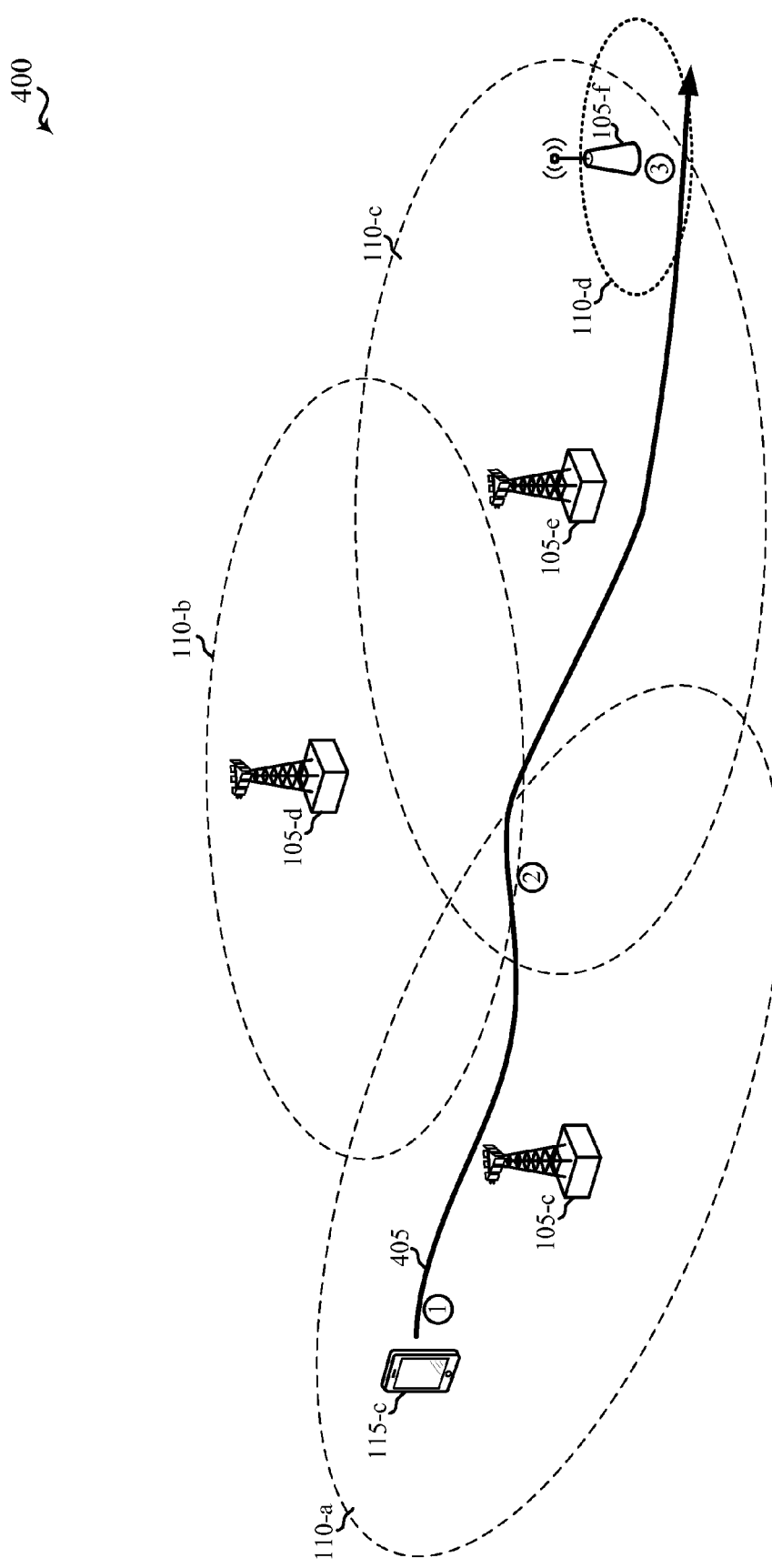
FIG. 4 shows a diagram of an example of device mobility in a wireless communications system, according to one aspect of the principles described herein.

FIG. 4 shows a diagram of an example of device mobility in a wireless communications system 400, according to one aspect of the principles described herein. In the wireless communications system 400 of FIG. 4, a mobile device 115-c travels along a route 405 through the coverage areas 110-a, 110-b, 110-c, 110-d of a first base station 105-c, a second base station 105-d, a third base station 105-e, and a fourth base station 105-f. The mobile device 115-c may be an example of one or more of the mobile devices 115 of FIGS. 1, 2, 3A, and/or 3B. Similarly, the base stations 105 of FIG. 4 may be examples of one or more of the base stations 105 of FIGS. 1, 2, 3A, and/or 3B.

Each base station 105 may represent an actual or potential serving cell for the mobile device 115-c. In the present example, the mobile device 115-c may begin at position 1 with the first base station 105-c as the serving cell. At position 1, the mobile device 115-c and the first base station 105-c may engage in a random access procedure. The mobile device 115-c may transmit a preamble, such as a RACH preamble, at multiple transmission power levels until the base station 105-c responds with a random access message, to establish a communication link with the base station 105-c In one example, the mobile device 115-c may access historical transmission power information associated with a current state of the mobile device 115-c based on mobility patterns of the mobile device 115-c to determine if there is any available information related to the time, e.g., time of day, time relative to the beginning of a known physical route, etc., place and/or route that the mobile device 115-*c* is currently traveling on. The mobile device 115-*c* may use known techniques for determining its current location such as GPS, network signaling, pathloss, Doppler, etc., and may determine the current time corresponding to the current location. The mobile device 115-*c* may then compare its current location, e.g. position 1, and time with values stored with the historical transmission power information. The mobile device 115-*c* may access previously stored data on the mobile device 115-*c* itself, and/or access the information via the wireless communications system 400.

The mobile device 115-*c* may then use historical transmission power information associated with mobility patterns of the mobile device 115-*c* or another mobile device 115 to predict a current random access transmission power that will elicit a random access response from the first base station 105-*c*. The predicted current random access transmission power may be the power at which the mobile device 115-*c* transmits a RACH preamble sequence to the first base station 105-*c* to initiate the random access procedure to establish a communication link. By using the predicted random access transmission power to initiate the random access procedure, rather than a standard transmission power, for example set generically by the wireless communications system 400, the number of power ramp steps, and hence link establishment time may be reduced.

The operation of using historical transmission power information associated with mobility patterns of the mobile device 115-*c* to predict a current random access transmission power, as described above, may also be implemented when the mobile device 115-*c* is located at position 2, position 3, or anywhere in-between, for example anywhere along the route 405 with any of the base stations 105.

At varying times and/or periodically, the mobile device 115-*c* may store its own mobility patterns and/or transmission power level or other information, such as one or more cell IDs, associated with its own particular mobility patterns. In some implementations, for example when the mobile device 115-*c* is located at position 2, the mobile device 115-*c* may predict that it is traveling on route 405 by accessing the previously stored mobility data. In other implementations, another mobile device 115 may have stored mobility patterns and/or channel information associated with its own particular mobility patterns, which are accessible to mobile device 115-*c* via the wireless communications system 400. In either case, the mobile device 115-*c* may access the historical transmission power information associated with the particular mobility pattern, e.g. route 405, to predict a current random access transmission power that will elicit a random access response from the second base station 105-*d*.

In one aspect, the mobile device 115-*c* may additionally determine a level of accuracy of the predicted current random access transmission power that will elicit a random access response from a base station 105, such as the second base station 105-*d*, for example. This accuracy determination may be based on a correlation between multiple locations recorded on the current travel route of the mobile device 115-*c* and multiple locations previously stored and associated with the historical transmission power information. The accuracy determination may also be based on a correlation between a current time that the mobile device 115-*c* is located at position 2 and a stored time value associated with the historical transmission power information. In other examples, other information and/or techniques may be used to determine an accuracy of a predicted current random access transmission power, such as by comparing cell IDs of a previously known route with cell IDs of current route, etc.

Based on the accuracy determination, the predicted current random access transmission power may either be scaled up or down, for example, to ensure that interference is minimized to nearby devices and/or systems. This may include scaling the predicted current random access transmission power down, for example, from the historic transmission power information when the historic transmission power information corresponds to one or more locations, times, and/or routes not including the current location, time, and/or route of mobile device 115-*c*. In other words, if the historical information does not correspond to the current location, time, and/or route of mobile device 115-*c* exactly, the prediction may be based on an extrapolation of the historical data. Additionally or alternatively, if path inconsistencies exist in the relevant geographic area, holes exist in the data, etc., the accuracy of the predicted current random access transmission power may be determined to be less. Based on the accuracy determination, the predicted current random access transmission power may then be scaled up or down to, for example, reduce possible interference in a geographic area with many devices/other networks, path inconsistencies, etc.

In one aspect, a predictive algorithm application may reside on the mobile device 115-*c*. Mobile device profile information (i.e., based on collected historical information associated with mobility patterns of the mobile device) and transmission power information may be stored by the mobile device 115-*c* for use by the predictive algorithm application. Over a certain learning period (e.g., twenty days), enough information (e.g., location, time, speed, cell measurements, etc.) may be collected by the mobile device 115-*c* to predict with a high degree of confidence where the mobile device 115-*c* will be on a certain day and time. Alternatively, a network entity (e.g., measurement server) may collect and store the profile information of the mobile device 115-*c*, and the predictive algorithm application of the mobile device 115-*c* may communicate with the network entity to access the mobile device profile information.

For example, when the signal strength drops in coverage area 110-*a*, the predictive algorithm application may identify with a high degree of confidence (e.g., >90%) that the mobile device 115-*c* is moving along a known route 405 and that the next coverage area along the route 405 is coverage area 110-*b*. This may similarly be determined when the mobile device 115-*c* approaches coverage areas 110-*c* and 110-*d*. In this scenario, if the confident level meets a predetermined threshold, the mobile device 115-*c* may base any current random access transmission power predictions on the historical transmission power information, without any decrease in the power actually transmitted to avoid interference. In other words, the mobile device 115-*c* may transmit a random access preamble at the highest predicted transmission power based on the mobility patterns, when the route 405 is confirmed with a high confidence via the techniques described above. This may decrease the number of power ramp steps needed to elicit a response from any of the base stations 105-*c*, 105-*d*, 105-*e*, and 105-*f*, reduce interference causes to nearby devices, etc. This may also allow the mobile device 115-*c* to conserve battery power as it may reduce the number of times it transmits a random access preamble before receiving a random access response from any of the base stations 105-*c*, 105-*d*, 105-*e*, and 105-*f*.

In some cases, the mobile device 115-*c* may deviate from the route 405. The mobile device may then switch to searching for other similar mobility pattern information upon which to based predictions of current random access transmission power. If no similar mobility patterns are found, the mobile device 115-*c* may reset to using a standard, e.g. set by the wireless communications system 400, initial random access transmission power. If at a later time, based on a comparison of the current movement of the mobile device 115-*c* and the stored mobility patterns, the mobile device 115-*c* returns to traveling on the route 405, the mobile device 115-*c* may again utilize the above described techniques to predict a current random access transmission power that will elicit a random access response from any of the base stations along route 405.

In certain examples, where the mobile device 115-*c* is measuring and storing transmission power information relative to mobility information, the mobile device 115-*c* may have the ability to create a mean and standard deviation for the transmission power information for each location, time, such as time of day, route, etc. The mean and standard deviation values for the transmission power information may allow the mobile device 115-*c* to adjust for temporary alterations to channel conditions. For example, the route 405 may include a train crossing that occasionally delays travel along the route 405. The mobile device 115-*c* may store or have access to a period of historical route information, channel information indicating that a delay in travel occurs relatively frequently at or around a certain time of day. The train may pass between the mobile device 115-*c* and the serving base station 105 during this delay, causing channel conditions to degrade significantly, even though the mobile device 115-*c* remains on the predicted route 405.

By tracking historical mean and standard deviation values for the serving cell's channel conditions, the predictive algorithm application residing on the network and/or the mobile device 115-*c* may identify that the degradation in channel conditions is a regular and expected occurrence, thereby allowing the mobile device 115-*c* to continue to rely on historical transmission power information for basing predictions of current random access transmission power that will elicit a response from a base station 105 along route 405.

In another aspect, the predictive behavior of the mobile device 115-*c* may be stored in a network entity (e.g., measurement server) and may be accessed by a predictive algorithm in the network to optimize power transmission predictions. One way in which behavior information may be collected is by tracking the electronic serial number (ESN) or the international subscriber identity (IMSI) through base stations (e.g., NB/eNBs), mobility management entities (MMEs), or other network devices. Over the learning period profile information may be collected by the network based on the observed behavior of the mobile device 115-*c*. The profile information may be used to predict with a high degree of confidence where a particular mobile device 115-*c* will be on a certain day and time.

The techniques described above when the mobile device 115-*c* is located at position 2 may also be applied when the mobile device 115-*c* is located anywhere along route 405, including at position 3 with the third base station 105-*e*, and at position 4 with fourth base station 105-*f*. Another input to the accuracy determination described above may be the number of location points and/or time values that correlate between the current mobility information of the mobile device 115-*c* and the previously stored data associated with the historical transmission power information.

The above techniques for predicting a current random access transmission power that will elicit a random access response from a target base station 105 based on accessed historical transmission power information associated with a current state of the mobile device 115-*c* and mobility patterns of the mobile device 115-*c* may be implemented in conjunction with, or independently of, handover operations among base stations 105-*c*, 105-*d*, 105-*e*, and/or 105-*f*.

Figure 5:
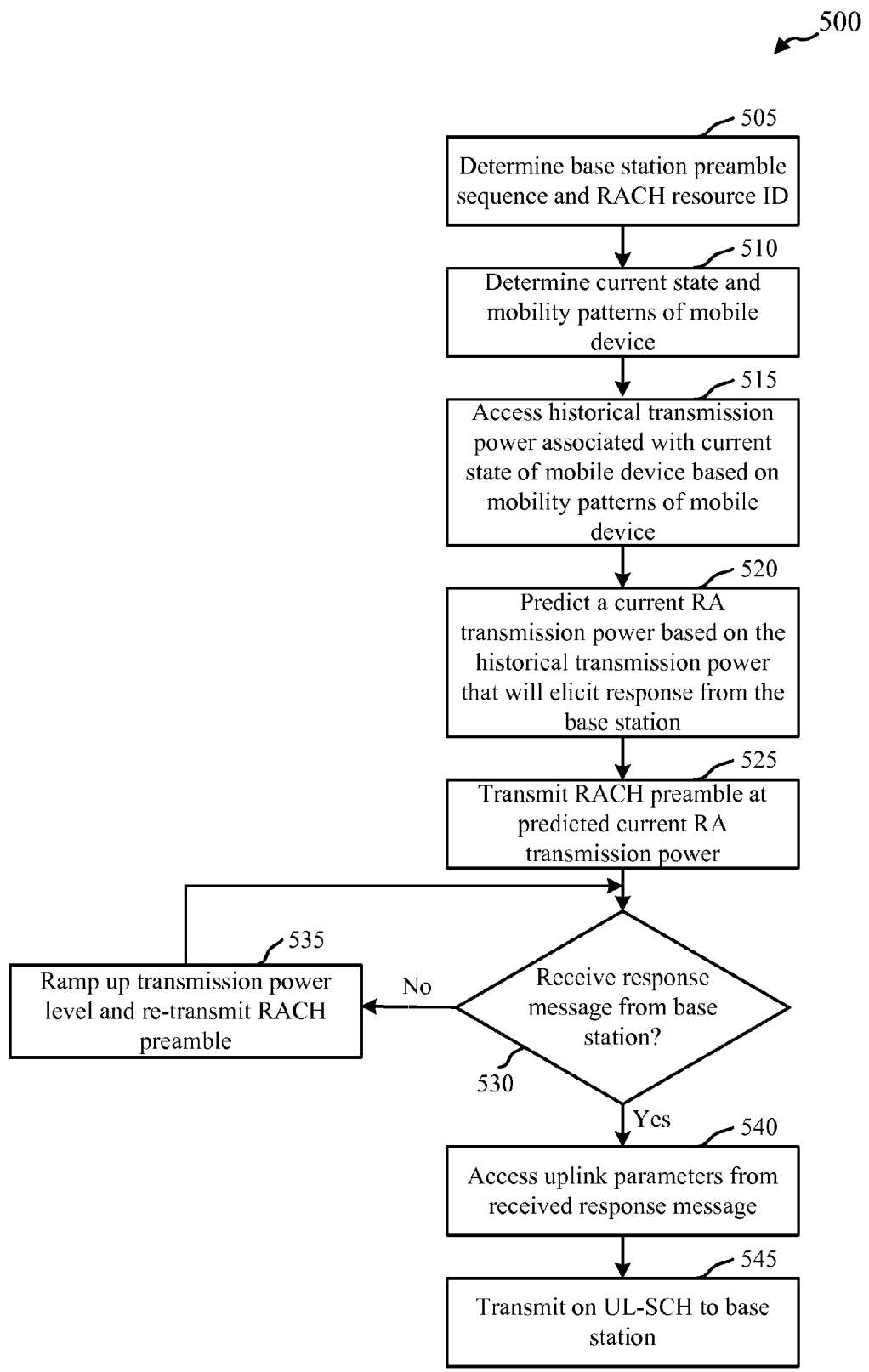
FIG. 5 shows a flow block diagram of an example of predicting a current random access transmission power based on historical transmission power information, according to one aspect of the principles described herein.

In reference to FIG. 5, a process 500 for predicting a current random access transmission power based on accessed historical transmission power information associated with a current state of a mobile device 115 and mobility patterns of the mobile device 115 is shown. The process 500 of FIG. 5 may be operable within, or incorporate one or more aspects of, wireless communications systems 100, 200-*a*, 200-*b*, 300, and/or 400 described in reference to the previous Figures. A mobile device 115, as described in reference to previous Figures, may implement the process 500 for predicting a current random access transmission power based on accessed historical transmission power information associated with a current state of a mobile device 115 and mobility patterns of the mobile device 115, in accordance with the techniques described above.

A mobile device 115 may determine a base station preamble sequence and RACH resource ID at block 505 for a base station 105 that the mobile device wishes to establish a communication link with. In some cases, the mobile device 115 may receive the preamble sequence and RACH resource ID broadcast from the target or another base station 105, or may determine the preamble sequence and the RACH resource ID on its own, via techniques well known in the art. The mobile device 115 may then determine a current state and mobility patterns of mobile device 115 at block 510. This may include using GPS or other techniques described above to determine a physical/geographic location, a current time, and/or a current route of the mobile device 115. In some cases, the mobile device 115 may compare cell IDs of its current physically route with cell IDs of a known physical route, for example that has been traveled by the mobile device 115 or another mobile device 115 previously. The prior route information, including one or more cell IDs of potential serving cells along the route, may be accessed via a database of the mobile device 115 or via a database of the network, for example. Based on the prior route information, the mobile device 115 may determine that it is currently traveling on a previously traveled route.

Based on the determined state and mobility patterns of the mobile device 115, the mobile device 115 may access historical transmission power associated with the current state and mobility patterns of the mobile device 115 at block 515. The mobile device 115 may search information stored on the mobile device 115 itself, and/or access network resources to search existing historical transmission power information according to the current state and mobility patterns of the mobile device 115. the mobile device 115 determining that it is traveling on a known physical route, e.g. route 405 of FIG. 4, and accessing historical transmission power information associated with route 405. This may further include comparing multiple physical locations through which the mobile device 115 is current traveling (or was recently located at) with stored locations associated with historical transmission power information.

The mobile device 115 may then predict a current random access transmission power based on the historical transmission power that will elicit a response from the base station 105 at block 520. This may include using route information to predict a future location of the mobile device 115, and correlating that to historical transmission power information for the future location. In some cases, the future location may include a predicted location that the mobile device 115 will be at when it transmits the RACH preamble to the base station 105, so as to account for delay in processing via blocks 505-520, for example. In some cases, the mobile device 115 may use route information to predict a future location of the mobile device 115, the future location being an estimated average of where the mobile device 115 will be located after, for example, one or two or other number of RACH preamble transmissions. This technique may be used to account for a high interference area, such that the mobile device 115 determines not to transmit at the highest relevant available historical transmission power to avoid causing undue interference to nearby devices and/or networks.

The mobile device 115 may then transmit the RACH preamble at the predicted current random access transmission power at block 525. After transmitting the RACH preamble at block 525, the mobile device 115 may determine if the mobile device 115 has received a response message, such as a random access response message, from the base station 105 at block 530. If the mobile device 115 does not receive a response from the base station 105, for example in a time period including a random access window and a backoff time, the mobile device 115 may ramp up the transmission power level and re-transmit the RACH preamble at the new, higher, transmission power level at block 535. In some cases, the random access window and/or backoff time may be configured by the serving network or may be determined by the mobile device 115. The mobile device 115 may then check if a response message is received at block 530. If no response is received at block 530, the mobile device 115 may ramp up the transmission power again and re-transmit the RACH preamble at block 535. The mobile device 115 may continue to check for a response message at block 530 and re-transmit the RACH preamble at a ramped up power level at block 535 until a response is received (block 530, Yes) from the base station 105.

Once a response message is received from the base station 105 (e.g., block 530, Yes), the mobile device 115 may access uplink channel parameters from the received response message at block 540. According to the uplink channel parameters, the mobile device 115 may then transmit uplink data to, and otherwise establish a communication link with, the base station 105 at block 545.

By initiating a random access procedure at a predicted current random access transmission power based on historical transmission power information associated with a current state and mobility patterns of a mobile device 115, the process 500 described above may be implemented to reduce a number of power ramp steps taken by the mobile device 115 during a random access procedure. In particular, the number of power ramp steps may be reduced from a random access procedure initiated at a standard transmission power, e.g., set by the network. Process 500 may additionally or alternatively be implemented by a mobile device 115 to reduce interference caused by the mobile device during a random access procedure.

Figure 6:
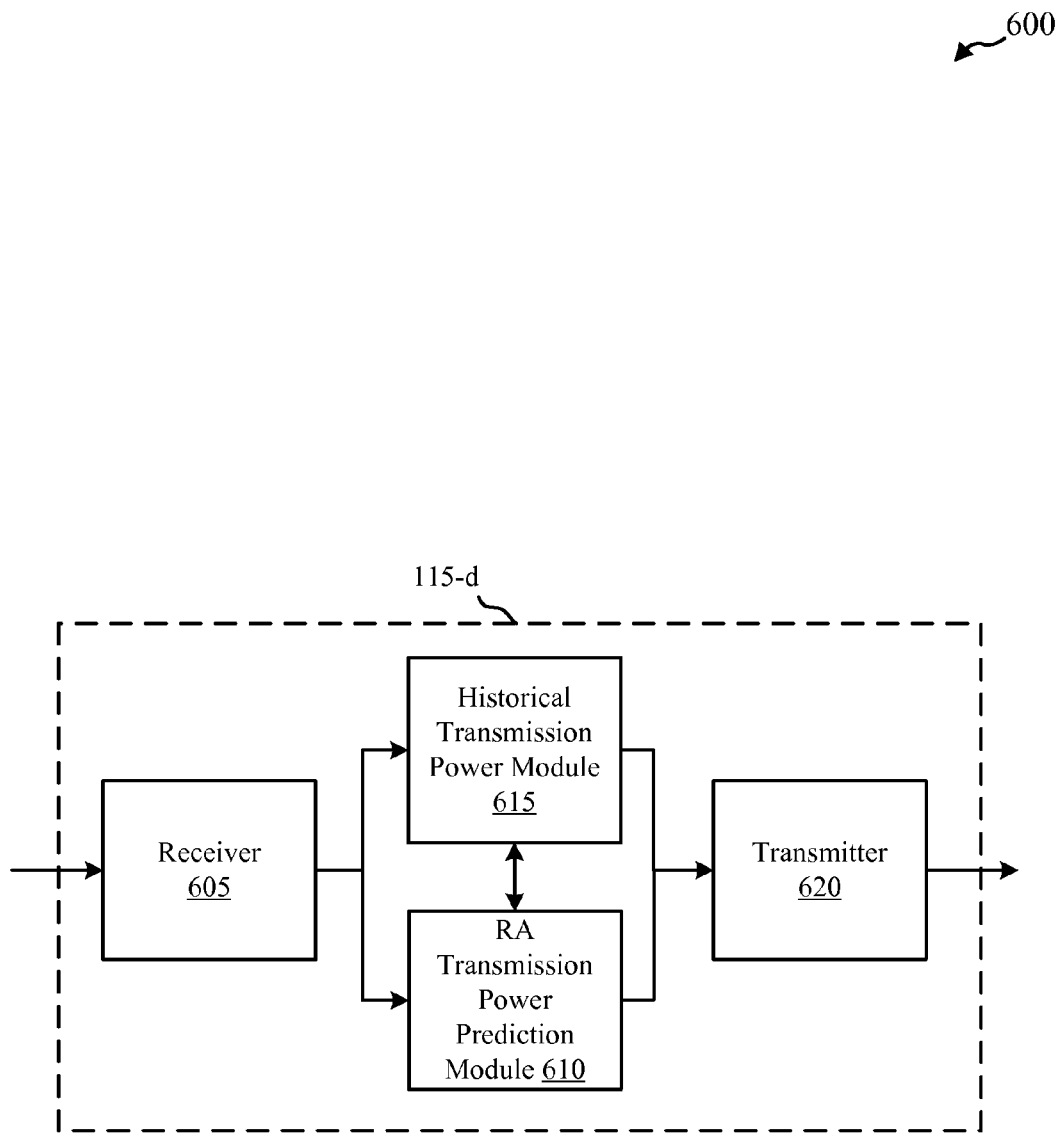
FIG. 6 shows a block diagram of one example of a mobile device configured to predict a current random access transmission power based on historical transmission power information, according to one aspect of the principles described herein.

FIG. 6 shows a block diagram 600 of a mobile device 115-*d* configured for predicting a current random access transmission power based on historical transmission power information associated with a current state and mobility patterns of the mobile device 115-*d*, in accordance with various examples. The mobile device 115-*d* may represent one or more of the mobile devices 115 described in previous Figures. The mobile device 115-*d* may also be a component of one or more of the wireless communications systems 200-*a*, 200-*b*, 300, 400 of FIGS. 2-4 and/or implement the process 500 of FIG. 5. The mobile device 115-*d* may include a receiver 605, a random access transmission power prediction module 610, a historical transmission power module 615, and/or a transmitter 620. Each of these components may be in communication with each other.

The receiver 605 may receive information such as packet, data, and/or signaling information regarding what the mobile device 115-*d* has received or transmitted. The received information may be utilized by the random access transmission power prediction module 610 and/or the historical transmission power module 615 for a variety of purposes. In some cases, receiver 605 may be configured to receive data or transmissions, for example from another device, such as from a mobile device 115 and/or a base station 105, to further enable the various techniques described above for predicting a current random access transmission power based on historical transmission power information.

The transmitter 620 may similarly transmit information such as packet, data, and/or signaling information from the mobile device 115-*d*. In some cases, transmitter 620 may be configured to send data according to various examples described herein, such as a random access preamble to a base stations 105, and/or other data to one or more mobile devices 115.

In one example, the receiver 605 may receive a preamble sequence and a PRACH resource ID broadcast from a nearby base station 105 to enable the mobile device 115-*d* to initiate a random access procedure to connect with the base station 105. In another example, the mobile device 115-*d* may determine the preamble sequence and PRACH resource ID on its own for initiating a random access procedure with the base station 105, such as through communications with a serving network, accessing memory of the mobile device 115-*d*, etc. In either case, the random access transmission power prediction module 610 may become aware that the mobile device 115-*d* is seeking to initiate a random access procedure with a base station 105. The random access transmission power prediction module 610 may then determine a current state and mobility patterns of the mobile device 115-*d*, via the techniques described above. In one aspect, the random access transmission power prediction module 610 may configure a request message and communicate the request message to the transmitter 620 to be transmitted to the network. The request message may request current state and/or mobility patterns of the mobile device 115-*d* from the network. A response message including the current state and mobility pattern information may then be received by the receiver 605 and communicated to the random access transmission power prediction module 610.

Based on the current state and mobility pattern information, the random access transmission power prediction module 610 may access relevant historical transmission power information associated with the current state and mobility patterns of the mobile device 115-*d*. To access the historical transmission power information, the RA transmission power prediction module 610 may directly search information stored in or by the historical transmission power module 615, or may request the historical transmission power module 615 to perform the search. In one aspect, some or all of the historical transmission power information may be stored locally at the mobile device 115-*d*. In another aspect, some or all of the historical transmission power information may be stored off-site from the mobile device 115-*d*. In this scenario, the mobile device 115-*d*, for example at the direction of the historical transmission power module 615, may request the desired historical transmission power information from the network, and retrieve the information via the transmitter 620 and the receiver 605.

Once the random access transmission power prediction module 610 has accessed the relevant historical transmission power information from the historical transmission power module 615, the random access transmission power prediction module 610 may predict a current random access transmission power that will elicit a response from the base station 105, via the techniques described above. The random access transmission power prediction module 610 may then communicate the current random access transmission power along with the preamble sequence and PRACH resource ID to the transmitter 620, for transmission to the base station 105.

Figure 7:
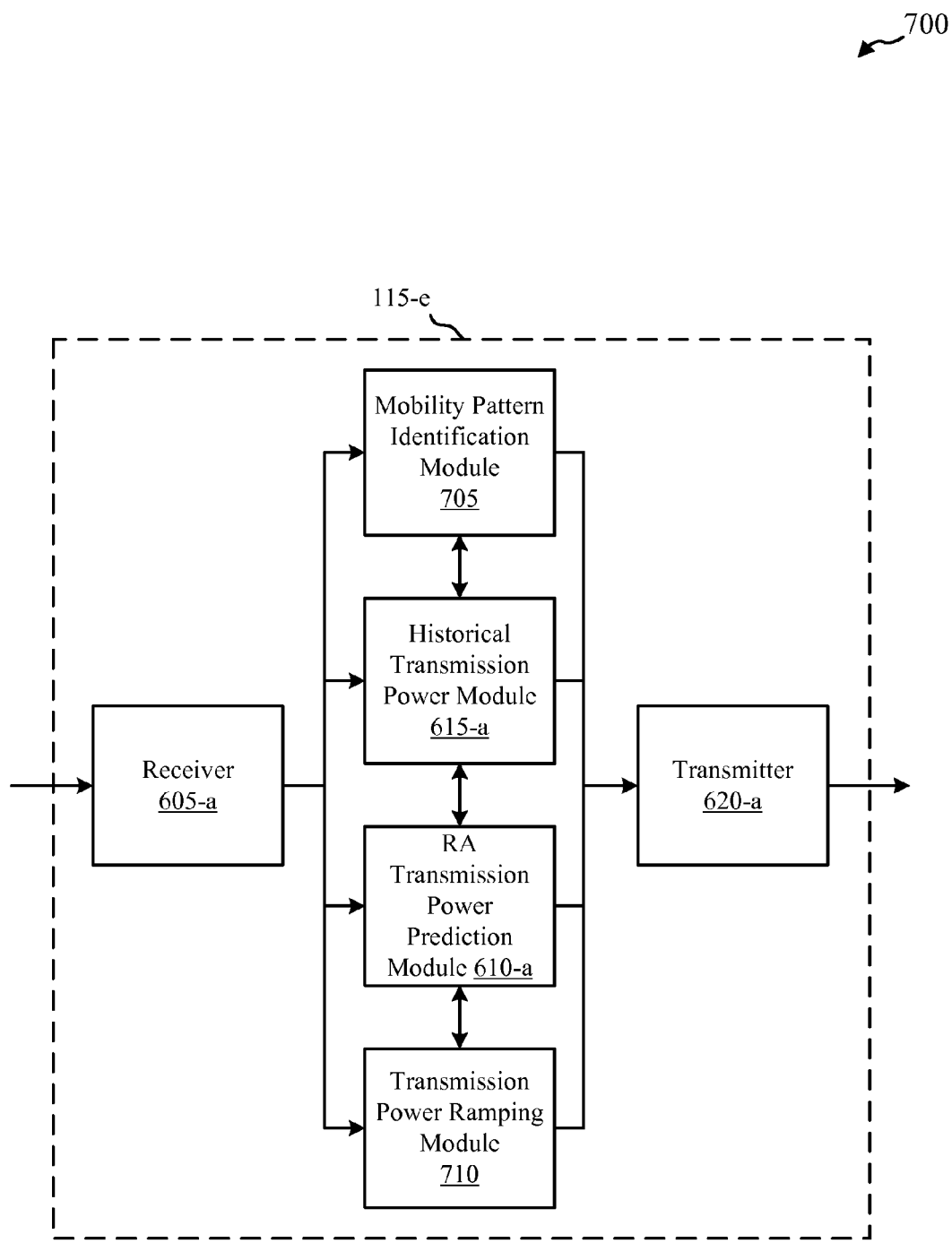
FIG. 7 shows a block diagram of another example of a mobile device configured to predict a current random access transmission power based on historical transmission power information, according to one aspect of the principles described herein.

FIG. 7 shows a block diagram 700 of a mobile device 115-e configured for predicting a current random access transmission power based on historical transmission power information associated with a current state and/or mobility patterns of the mobile device 115-e, in accordance with various examples. The mobile device 115-e may represent one or more of the mobile devices 115 described in previous Figures. The mobile device 115-e may also be a component of one or more of the wireless communications systems 200-a, 200-b, 300, 400 of FIGS. 2-4 and/or implement the process 500 of FIG. 5. The mobile device 115-e may include a receiver 605-a, a random access transmission power prediction module 610-a, a historical transmission power module 615-a, a mobility pattern identification module 705, a transmission power ramping module 710, and/or a transmitter 620-a. Each of these components may be in communication with each other.

The receiver 605-a may receive information such as packet, data, and/or signaling information regarding what the mobile device 115-e has received or transmitted. The received information may be utilized by the random access transmission power prediction module 610-a, the historical transmission power module 615-a, the mobility pattern identification module 705, and/or the transmission power ramping module 710 for a variety of purposes. In some cases, receiver 605-a may be configured to receive data or transmissions, for example from another device, such as from a mobile device 115 and/or a base station 105, to further enable the various techniques described above for predicting a current random access transmission power based on historical transmission power information.

The transmitter 620-a may similarly transmit information such as packet, data, and/or signaling information from the mobile device 115-e. In some cases, transmitter 620-a may be configured to send data according to various examples described herein, such as a RACH preamble to a base stations 105, and/or other data to one or more mobile devices 115.

In one example, the receiver 605-a may receive a preamble sequence and a PRACH resource ID broadcast from a nearby base station 105 to enable the mobile device 115-e to initiate a random access procedure to connect with the base station 105. In another example, the mobile device 115-e may determine the preamble sequence and PRACH resource ID on its own. In either case, the random access transmission power prediction module 610 may become aware that the mobile device 115-e is seeking to initiate a random access procedure with a base station 105. The random access transmission power prediction module 610-a may then instruct or request the mobility pattern identification module 705 to determine the current state, e.g. location, time, and/or route of the mobile device 115-e. The mobility pattern identification module 705 may determine the current state and mobility patterns of the mobile device 115-e via the techniques described above, and communicate this information to the random access transmission power prediction module 610-a and/or the historical transmission power module 615-a.

In one aspect, the random access transmission power prediction module 610-a may access or instruct the historical transmission power module 615-a to retrieve historical transmission power information associated with the current state and mobility patterns of the mobile device 115-e determined by the mobility pattern identification module 705. In another aspect, the historical transmission power module 615-a may retrieve the relevant information associated with the current state and mobility patterns of the mobile device 115-e determined by the mobility pattern identification module 705 directly. Once the historical transmission power information has been accessed, the information may be communicated to the random access transmission power prediction module 610-a.

With the historical transmission power information, the random access transmission power prediction module 610-a may predict a current random access transmission power that will elicit a response from the target base station 105, via the techniques described above. The predicted current random access transmission power along with the preamble sequence and PRACH resource ID may be communicated to the transmitter 620-a to begin the random access procedure.

After transmitting the preamble sequence at the predicted current random access transmission power, the mobile device 115-e may wait for a period including a random access window and a backoff time to receive a response message from the target base station 105. If no response is received in that time period, the random access transmission power prediction module 610-a may instruct the transmission power ramping module 710 to ramp up a next random access transmission power one step from the predicted current random access transmission power. The next random access transmission power, the preamble sequence, and/or the PRACH resource ID may then be communicated (as needed) to the transmitter 620-a to re-transmit the preamble sequence at the next random access transmission power.

The mobile device 115-e may continue to wait for a set time period, ramp up the subsequent random access transmission power, and re-transmit the preamble sequence at the new random access transmission power via the techniques described above, until a response message is received from the target base station 105. Once a response message is received, the mobile device 115-e may store the random access transmission power last used before receiving the response message, along with current mobility information determined by the mobility pattern identification module 705, as a new or updated entry in the historical transmission power module 615-a. In this way, the historical transmission power information may be continually updated and provide for increasing accuracy in current random access transmission power predictions.

Figure 8:
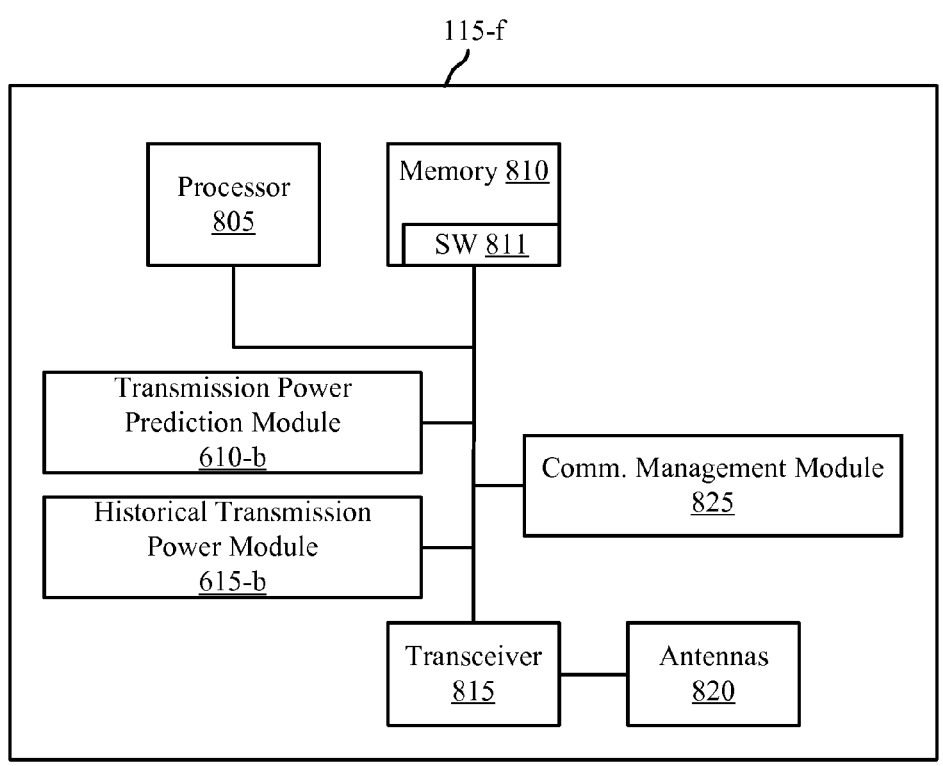
FIG. 8 shows a block diagram of an example of a mobile device configured to predict a current random access transmission power based on historical transmission power information, according to one aspect of the principles described herein.

FIG. 8 shows a block diagram of one example of a mobile device 115-f, according to one aspect of the principles described herein. The mobile device 115-f may be an example of one or more of the mobile devices 115 described above with reference to the previous Figures. The mobile device 115-f may also be a component of one or more of the wireless communications systems 200-a, 200-b, 300, 400 of FIGS. 2-4 and/or implement the process 500 of FIG. 5.

The mobile device 115-f of FIG. 8 may include a processor 805, a memory 810, a transceiver 815, one or more antennas 820, a communication management module 825, a random access transmission power prediction module 610-*b*, and a historical transmission power module 615-*a*. Each of these components may be in communication, directly or indirectly.

The memory 810 may include random access memory (RAM) and/or read-only memory (ROM). The memory 810 may store computer-readable, computer-executable software (SW) code 811 containing instructions that are configured to, when executed, cause the processor 805 to perform various functions described herein for communicating over a wireless communications system. Alternatively, the software code 811 may not be directly executable by the processor 805 but may be configured to cause the mobile device 115-*f* (e.g., when compiled and executed) to perform various of the functions described herein.

The processor 805 may include an intelligent hardware device, e.g., a central processing unit (CPU) such as an ARM® based processor, a microcontroller, an ASIC, etc. The processor 805 may process information received through the transceiver module(s) 815 and/or information to be sent to the transceiver module(s) 815 for transmission through the antenna(s) 820. The processor 805 may handle, alone or in connection with the communication management module 825, various aspects of communicating over a wireless communications system and/or detecting a communications network.

The transceiver module(s) 815 may include a modem configured to modulate packets and provide the modulated packets to the antenna(s) 820 for transmission, and to demodulate packets received from the antenna(s) 820. The transceiver module(s) 815 may in some cases be implemented as one or more transmitter modules and one or more separate receiver modules. The transceiver module(s) 815 may be configured to communicate bi-directionally, via the antenna(s) 820, with one or more base stations 105 described with reference to previous Figures.

The components of the mobile device 115-*f* may be configured to implement aspects discussed above with respect to the mobile devices 115 of previous Figures, and may not be repeated here for the sake of brevity. For example, the random access transmission power prediction module 610-*b* may include similar functionality as the random access transmission power prediction module 610 of FIGS. 6 and/or 7. The historical transmission power module 615-*b* may also include similar functionality as the historical transmission power module 615 of FIGS. 6 and/or 7. The random access transmission power prediction module 610-*b* and the historical transmission power module 615-*b* may enable mobile device 115-*f* to predict a current random access transmission power based on historical transmission power information associated with a current state and mobility patterns of the mobile device 115-*f*, in accordance with various examples.

In some examples, the transceiver 815 in conjunction with antenna(s) 820, along with other possible components of the mobile device 115-*f*, may receive transmissions from one or more base stations 105 and may transmit uplink data from the to one or more base stations 105 or a core network 130 via the techniques described herein. In some examples, the transceiver 815, in conjunction with antennas 820 along with other possible components of mobile device 115-*f*, including memory 810, may enable the mobile device 115-*f* to access historical transmission power information associated with the current state and mobility patterns of the mobile device 115-*f* or another mobile device 115. The historical transmission power information may be stored in the memory 810, such as information relating to previous communications of the mobile device 115-*f*, or may be of other mobile devices 115 accessed through the network via transceiver 815 and antennas 820.

Figure 9:
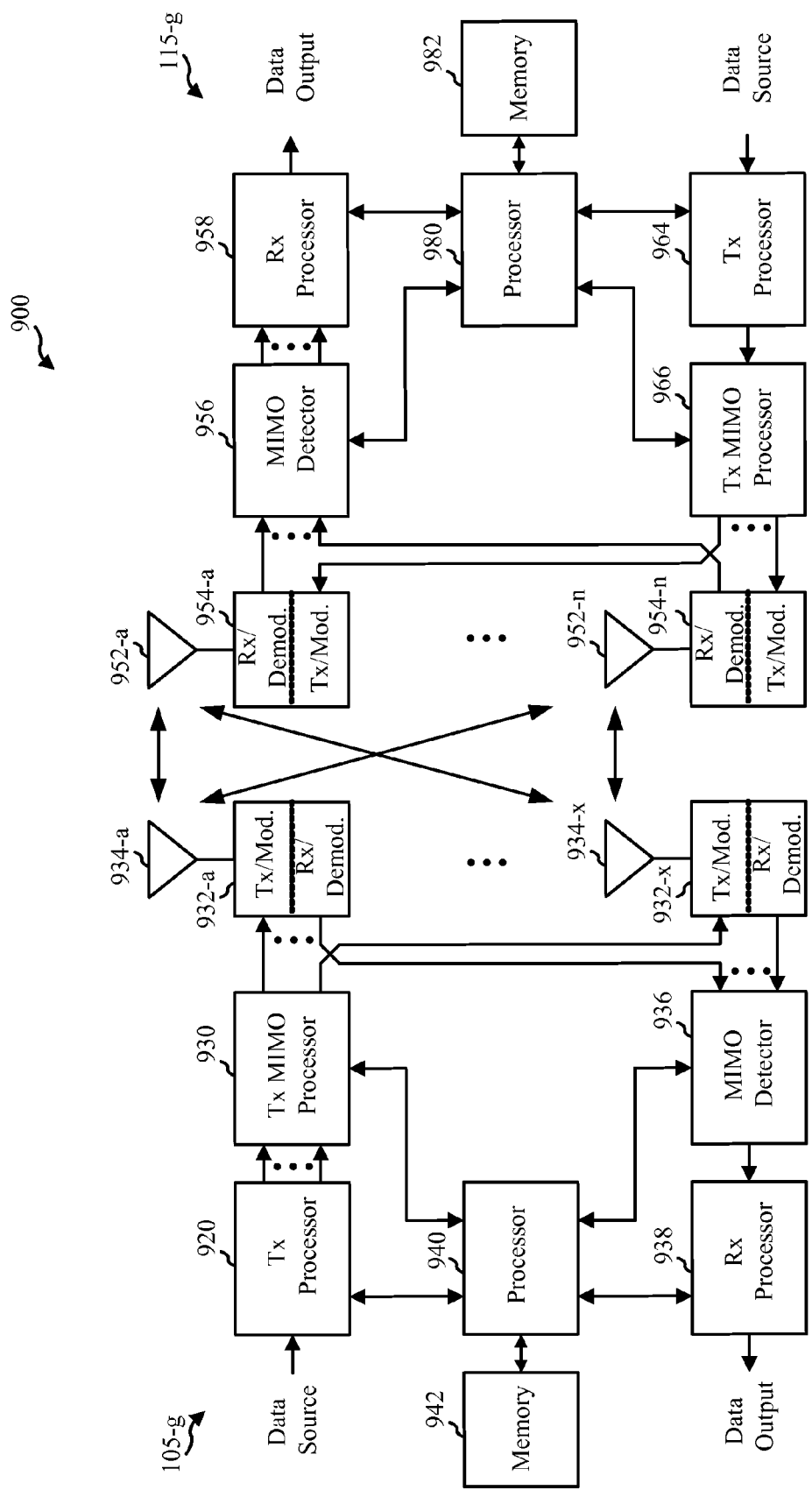
FIG. 9 shows a block diagram of a wireless communications system, according to one aspect of the principles described herein.

FIG. 9 shows a block diagram of a wireless communications system 900, according to one aspect of the principles described herein. Specifically, FIG. 9 illustrates a design of a base station 105-*g* and a mobile device 115-*g*, in accordance with an aspect of the present disclosure. The wireless communications system 900 may illustrate aspects of one or more of the wireless communications systems 100, 200-*a*, 200-*b*, 300, 400 of FIGS. 1-4 and/or implement the process 500 of FIG. 5. Furthermore, base station 105-*g* and/or mobile device 115-*g* may include some or all aspects of the base stations 105 and mobile devices 115 described in reference to any of the previous Figures.

The base station 105-*g* may be equipped with base station antennas 934-*a* through 934-*x*, where x is a positive integer, and the mobile device 115-*g* may be equipped with mobile device antennas 952-*a* through 952-*n*, where n is a positive integer. In the wireless communications system 900, the base station 105-*g* may be able to send data over multiple communication links at the same time. Each communication link may be called a "layer" and the "rank" of the communication link may indicate the number of layers used for communication. For example, in a 2×2 MIMO system where base station 105-*g* transmits two "layers," the rank of the communication link between the base station 105-*g* and the mobile device 115-*g* is two.

At the base station 105-*g*, a base station transmit processor 920 may receive data from a base station data source and control information from a processor 940 (or controller). The control information may be for the PBCH, PCFICH, PHICH, PDCCH, etc. The data may be for the PDSCH, etc. The base station transmit processor 920 may process (e.g., encode and symbol map) the data and control information to obtain data symbols and control symbols, respectively. The base station transmit processor 920 may also generate reference symbols, e.g., for the PSS, SSS, and cell-specific reference signal. A base station transmit (TX) MIMO processor 930 may perform spatial processing (e.g., precoding) on data symbols, control symbols, and/or reference symbols, if applicable, and may provide output symbol streams to the base station modulator/demodulators 932-*a* through 932-*x*. Each base station modulator/demodulator 932 may process a respective output symbol stream (e.g., for OFDM, etc.) to obtain an output sample stream. Each base station modulator/demodulator 932 may further process (e.g., convert to analog, amplify, filter, and upconvert) the output sample stream to obtain a downlink (DL) signal. In one example, DL signals from base station modulator/demodulators 932-*a* through 932-*x* may be transmitted via the base station antennas 934-*a* through 934-*x*, respectively.

At the mobile device 115-*g*, the mobile device antennas 952-*a* through 952-*n* may receive the DL signals from the base station 105-*g* and may provide the received signals to the mobile device modulator/demodulators 954-*a* through 954-*n*, respectively. Each mobile device modulator/demodulator 954 may condition (e.g., filter, amplify, downconvert, and digitize) a respective received signal to obtain input samples. Each mobile device modulator/demodulator 954 may further process the input samples (e.g., for OFDM, etc.) to obtain received symbols. A mobile device MIMO detector 956 may obtain received symbols from all the mobile device modulator/demodulators 954-*a* through 954-*n*, perform MIMO detection on the received symbols if applicable, and provide detected symbols. A mobile device receiver (Rx) processor 958 may process (e.g., demodulate, deinterleave, and decode) the detected symbols, providing decoded data for the mobile device 115-g to a data output, and provide decoded control information to a processor 980, or mobile device memory 982.

On the uplink (UL), at the mobile device 115-g, a mobile device transmit processor 964 may receive and process data from a mobile device data source. The mobile device transmit processor 964 may also generate reference symbols for a reference signal. The symbols from the mobile device transmit processor 964 may be precoded by a mobile device transmit MIMO processor 966 if applicable, further processed by the mobile device modulator/demodulators 954-a through 954-n (e.g., for SC-FDMA, etc.), and be transmitted to the base station 105-g in accordance with the transmission parameters received from the base station 105-g. At the base station 105-g, the UL signals from the mobile device 115-g may be received by the base station antennas 934, processed by the base station modulator/demodulators 932, detected by a base station MIMO detector 936 if applicable, and further processed by a base station receive processor 938. The base station receive processor 938 may provide decoded data to a base station data output and to the processor 940.

The components of the mobile device 115-g may, individually or collectively, be implemented with one or more Application Specific Integrated Circuits (ASICs) adapted to perform some or all of the applicable functions in hardware. Each of the noted modules may be a means for performing one or more functions related to operation of the wireless communications system 900. Similarly, the components of the base station 105-g may, individually or collectively, be implemented with one or more Application Specific Integrated Circuits (ASICs) adapted to perform some or all of the applicable functions in hardware. Each of the noted components may be a means for performing one or more functions related to operation of the wireless communications system 900.

The communication networks that may accommodate some of the various disclosed examples may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. At the Physical layer, the transport channels may be mapped to Physical channels.

A channel response may be estimated by each of the receive processors 938, 958 of the base station 105-g and the mobile device 115-g. The estimated channel response may be used to perform space, space/time processing at the receiver, adjust power levels, change modulation rates or schemes, or other actions. Each receive processor 938, 958 may further estimate the signal-to-noise-and-interference ratios (SNRs) of the detected symbol streams, and possibly other channel characteristics, and provides these quantities to a processor 940, 980. The receive processors 938, 958 or the processors 940, 980 may further derive an estimate of the "operating" SNR for the system. Processors 940, 980 may then provide channel state information (CSI), which may comprise various types of information regarding the communication link and/or the received data stream. For example, the CSI may comprise only the operating SNR. In other aspects, the CSI may comprise a channel quality indicator (CQI), which may be a numerical value indicative of one or more channel conditions. The CSI is then processed by a transmit processor 920, 964, modulated by mobile device modulator/demodulators 954, and transmitted via antennas 934, 952.

In one configuration, the mobile device 115-g may initiate a random procedure with the base station 105-g, and may include means for predicting a current random transmission power based on historical transmission power information associated with a current state and/or mobility patterns of the mobile device 115-g. In one aspect, the aforementioned means may be the mobile device controller/processor 980, the mobile device memory 982, the mobile device transmit processor 964, mobile device receive processor 958, the mobile device modulators/demodulators 954, and the mobile device antennas 952 configured to perform the functions recited by the aforementioned means.

Figure 10:
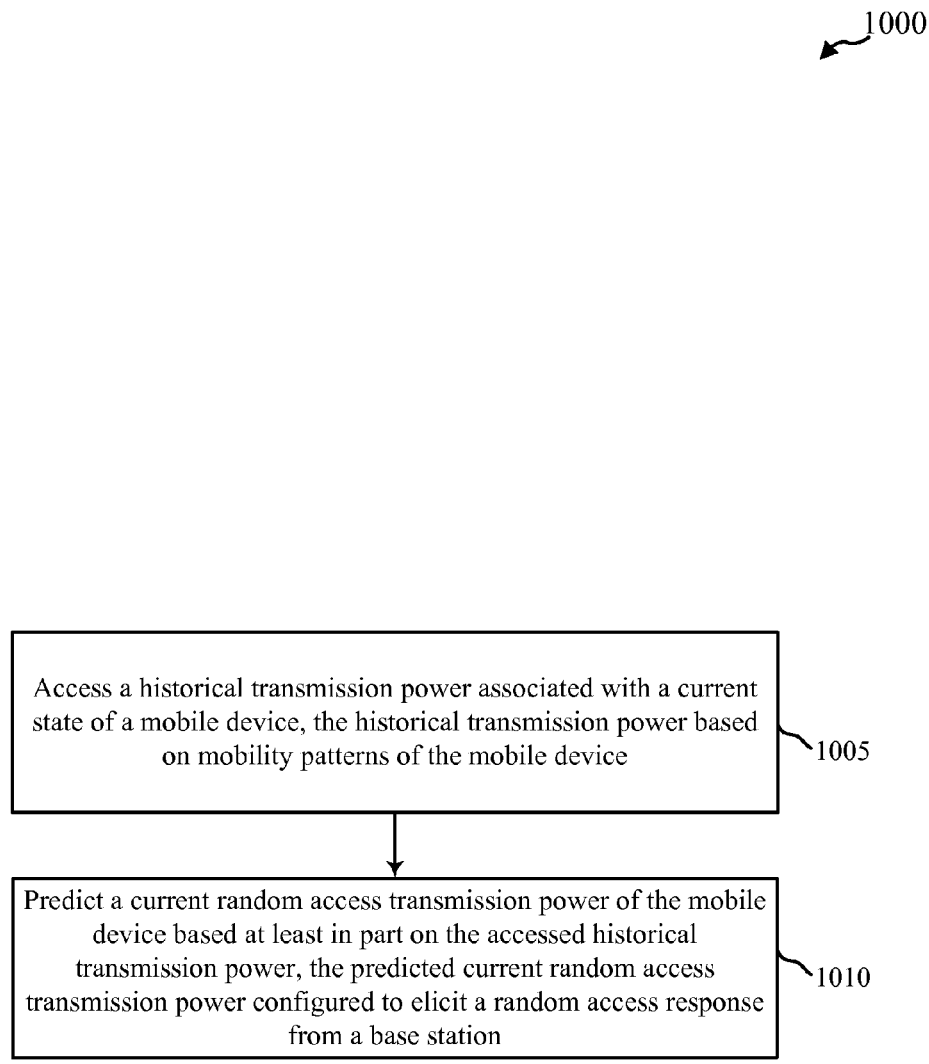
FIG. 10 shows a flowchart diagram of a method for predicting a current random access transmission power based on historical transmission power information, according to one aspect of the principles described herein.

FIG. 10 shows a flowchart diagram of a method 1000 for predicting a current random access transmission power based on historical transmission power information associated with a current state and mobility patterns of a mobile device 115, in accordance with an aspect of the present disclosure. Specifically, FIG. 10 illustrates a method 1000 of improving network and/or mobile device performance based on accessing and predicting the behavior of a mobile device 115. The method 1000 may illustrate aspects of one or more of the wireless communications systems 100, 200, 400, and/or 900, of FIGS. 1, 2A, 2B, 4 and/or 9, and/or implement aspects of one or more processes 200-a, 200-b, 300, and/or 500 of FIGS. 2A, 2B, 3, and/or 5. Furthermore, method 1000 may be performed by any of the mobile devices 115 described above in reference to previous Figures.

At block 1005, a mobile device 115 may access a historical transmission power associated with a current state of the mobile device, the historical transmission power based on mobility patterns of the mobile device. The accessed historical transmission power information may include random access transmission power values that successfully elicited a random access response from a target base station 105 associated with a location, time, and/or route of a mobile device 115. The historical transmission power information may be accessed locally on the mobile device 115, or accessed via a network.

At block 1310, the mobile device 115 may predict a current random access transmission power to be used by the mobile device based at least in part on the accessed historical transmission power. The predicted current random access transmission power may be configured to elicit a RA response from a target base station 105.

It should be noted that the method 1000 is just one implementation and that the operations of the method 1000 may be rearranged or otherwise modified such that other implementations are possible.

Figure 11:
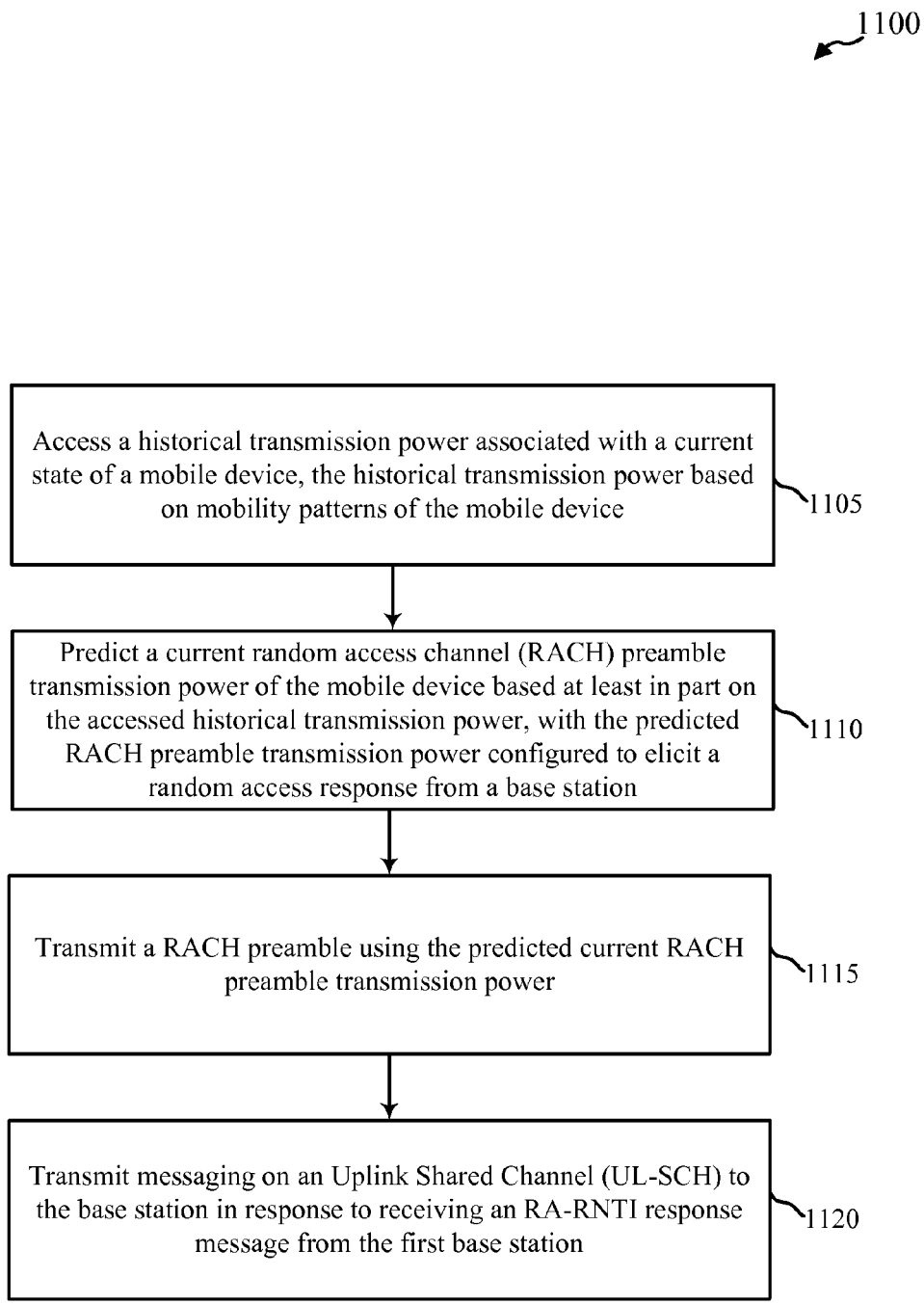
FIG. 11 shows a flowchart diagram of another method for predicting a current random access transmission power based on historical transmission power information, according to one aspect of the principles described herein.

FIG. 11 shows a flowchart diagram of another method 1100 for predicting a current random access transmission power based on historical transmission power information associated with a current state and mobility patterns of a mobile device 115, in accordance with an aspect of the present disclosure. Specifically, FIG. 11 illustrates a method 1100 of improving network and/or mobile device performance based on accessing and predicting the behavior of a mobile device 115. The method 1100 may illustrate aspects of one or more of the wireless communications systems 100, 200, 400, and/or 900, of FIGS. 1, 2A, 2B, 4, and/or 9, and/or implement aspects of one or more processes 200-a, 200-b, 300, and/or 500 of FIGS. 2A, 2B, 3, and/or 5. Furthermore, method 1100 may be performed by any of the mobile devices 115 described above in reference to previous Figures.

At block 1105, a mobile device 115 may access a historical transmission power associated with a current state of the mobile device, the historical transmission power based on mobility patterns of the mobile device. The accessed historical transmission power information may include random access transmission power values that successfully elicited a random access response from a target base station 105 associated with a location, time, and/or route of a mobile device 115. The historical transmission power information may be accessed locally on the mobile device 115, or accessed via a network.

At block 1110, the mobile device 115 may predict a current random access preamble, such as a RACH preamble, transmission power to be used by the mobile device based at least in part on the accessed historical transmission power. The predicted current RACH preamble transmission power may be configured to elicit a random access response from a target base station 105.

At block 1115, the mobile device 115 may transmit a RACH preamble using the predicted current RACH preamble transmission power. After a certain time period during which no response message from the target base station 105 is received, the mobile device 115 may ramp up the predicted current RACH preamble transmission power and re-transmit the RACH preamble at the new transmission power. The mobile device 115 may continue to ramp up the transmission power and re-transmit the RACH preamble at the new ramped up transmission power until a response is received from the target base station 105. Once the mobile device receives a response message from the target base station 105, such as a an RA-RNTI response message, the method 1100 may proceed to block 1120.

At block 1120, the mobile device 115 may transmit messaging on an Uplink Shared Channel (UL-SCH) to the target base station 105 in response to receiving an RA-RNTI response message from the target base station 105. The communication link between the mobile device 115 and the target base station 105 may then be fully active for both uplink and downlink communications.

In one aspect, a mobile device 115 implementing method 110 may reduce a number of power ramp steps taken by the mobile device 115 during a random access procedure by using the predicted current random access or RACH preamble transmission power. The mobile device 115 implementing method 110 may additionally or alternatively reduce interference caused by the mobile device 115 during a random access procedure by using the predicted current random or RACH preamble access transmission power.

It should be noted that the method 1100 is just one implementation and that the operations of the method 1100 may be rearranged or otherwise modified such that other implementations are possible.

Figure 12:
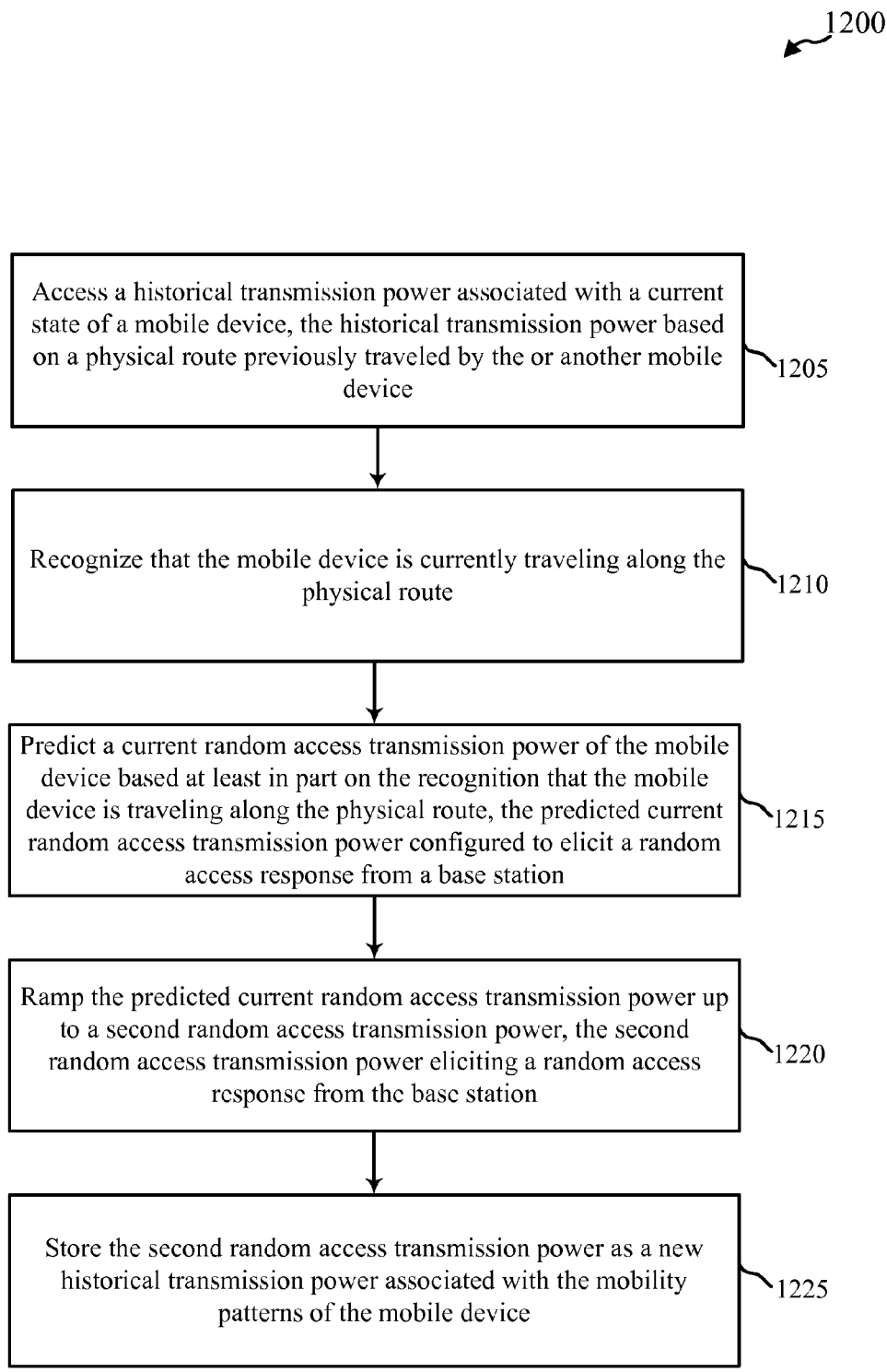
FIG. 12 shows a flowchart diagram of another method for predicting a current random access transmission power based on historical transmission power information, according to one aspect of the principles described herein.

FIG. 12 shows a flowchart diagram of another method 1200 for predicting a current random access transmission power based on historical transmission power information associated with a current state and mobility patterns of a mobile device 115, in accordance with an aspect of the present disclosure. Specifically, FIG. 12 illustrates a method 1200 of improving network and/or mobile device performance based on accessing and predicting the behavior of a mobile device 115. The method 1200 may illustrate aspects of one or more of the wireless communications systems 100, 200, 400, and/or 900, of FIGS. 1, 2A, 2B, 4 and/or 9, and/or implement aspects of one or more processes 200-a, 200-b, 300, and/or 500 of FIGS. 2A, 2B, 3, and/or 5. Furthermore, method 1200 may be performed by any of the mobile devices 115 described above in reference to previous Figures.

At block 1205, a mobile device 115 may access a historical transmission power associated with a current state of the mobile device, the historical transmission power based on mobility patterns of the mobile device. The accessed historical transmission power information may include random access transmission power values that successfully elicited a random access response from a target base station 105 associated with a physical route previously traveled by the or another mobile device 115. The historical transmission power information may be accessed locally on the mobile device 115, or accessed via a network.

At block 1210, the mobile device 115 may recognize that the mobile device 115 is currently traveling along the physical route previously traveled by a mobile device 115. The mobile device may recognize that it is traveling on a known physical route by comparing multiple locations and times corresponding to historical transmission power information with current mobility patterns of the mobile device 115.

At block 1215, the mobile device 115 may predict a current random access transmission power of the mobile device 115 based at least in part on the recognition that the mobile device is traveling along the physical route. The predicted current random access transmission power may be configured to elicit a random access response from a target base station 105.

At block 1220, the mobile device 115 may ramp the predicted current random access transmission power up to a second random access transmission power, with the second random access transmission power actually eliciting a random access response from the base station. The mobile device 115 may ramp up the predicted current random access transmission power after waiting for a time period and receiving no random access response from the target base station 105.

At block 1220, the mobile device 115 may store the second random access transmission power as a new historical transmission power associated with the current state and mobility patterns of the mobile device 115. This may ensure that the historical transmission power information is current to allow more accurate predictions of random access transmission power by various mobile devices 115.

It should be noted that the method 1200 is just one implementation and that the operations of the method 1200 may be rearranged or otherwise modified such that other implementations are possible.

The detailed description set forth above in connection with the appended drawings describes exemplary examples and does not represent the only examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-Ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication, comprising:
    accessing a historical transmission power of a mobile device associated with a current state of the mobile device, the historical transmission power based on mobility patterns of the mobile device; and
    predicting a current random access transmission power of the mobile device based at least in part on the accessed historical transmission power, the predicted current random access transmission power configured to elicit a random access response from a base station.

2. The method of claim 1, wherein the current random access transmission power comprises a random access channel (RACH) preamble transmission power.

3. The method of claim 2, further comprising:
    transmitting a RACH preamble using the predicted current random access transmission power.

4. The method of claim 1, wherein the random access response elicited from the base station comprises a random access radio network temporary identifier (RA-RNTI) message.

5. The method of claim 4, further comprising:
    transmitting messaging on an Uplink Shared Channel (UL-SCH) to the base station in response to receiving the RA-RNTI message from the base station.

6. The method of claim 1, further comprising:
    reducing a number of power ramp steps taken by the mobile device during a random access procedure based on the predicted current random access transmission power.

7. The method of claim 1, further comprising:
    reducing interference from the mobile device during a random access procedure based on the predicted current random access transmission power.

8. The method of claim 1, wherein the accessed historical transmission power corresponds to at least one of a geographic location in a known physical route of the mobile device, a current cell identification (ID) in the known physical route of the mobile device, or at least one other cell ID in the known physical route of the mobile device.

9. The method of claim 8, wherein the historical transmission power comprises an amount of transmission power associated with receiving a past random access response associated with at least one of the geographic location, the current cell ID, or the at least one other cell ID.

10. The method of claim 1, wherein the mobility patterns of the mobile device comprise a physical route previously travelled by the mobile device or another mobile device.

11. The method of claim 10, further comprising:
    recognizing that the mobile device is currently traveling along the physical route;
    wherein predicting the current random access transmission power of the mobile device is based at least in part on the recognition.

12. The method of claim 1, further comprising:
ramping the predicted current random access transmission power up to a second random access transmission power, the second random access transmission power eliciting a random access response from the base station; and
storing the second random access transmission power as a new historical transmission power associated with the mobility patterns of the mobile device.

13. A wireless communications apparatus, comprising:
a processor; and
a memory in electronic communication with the processor, the memory embodying instructions, the instructions being executable by the processor to:
access a historical transmission power of a mobile device associated with a current state of the mobile device, the historical transmission power based on mobility patterns of the mobile device; and
predict a current random access transmission power of the mobile device based at least in part on the accessed historical transmission power, the predicted current random access transmission power configured to elicit a random access response from a base station.

14. The wireless communications apparatus of claim 13, wherein the current random access transmission power comprises a random access channel (RACH) preamble transmission power.

15. The wireless communications apparatus of claim 14, wherein the instructions are further executable by the processor to:
transmit a RACH preamble using the predicted current random access transmission power.

16. The wireless communications apparatus of claim 13, wherein the instructions are further executable by the processor to:
reduce a number of power ramp steps taken by the mobile device during a random access procedure based on the predicted current random access transmission power.

17. The wireless communications apparatus of claim 13, wherein the instructions are further executable by the processor to:
reduce interference from the mobile device during a random access procedure based on the predicted current random access transmission power.

18. The wireless communications apparatus of claim 13, wherein the accessed historical transmission power corresponds to at least one of a geographic location in a known physical route of the mobile device, a current cell identification (ID) in the known physical route of the mobile device, or at least one other cell ID in the known physical route of the mobile device.

19. The wireless communications apparatus of claim 13, wherein the mobility patterns of the mobile device comprise a physical route previously travelled by the mobile device or another mobile device.

20. The wireless communications apparatus of claim 19, wherein the instructions are further executable by the processor to:
recognize that the mobile device is currently traveling along the physical route;
wherein predicting the current random access transmission power of the mobile device is based at least in part on the recognition.

21. The wireless communications apparatus of claim 13, wherein the instructions are further executable by the processor to:
ramp the predicted current random access transmission power up to a second random access transmission power, the second random access transmission power eliciting a random access response from the base station; and
store the second random access transmission power as a new historical transmission power associated with the mobility patterns of the mobile device.

22. A mobile device, comprising:
means for accessing a historical transmission power of the mobile device associated with a current state of the mobile device, the historical transmission power based on mobility patterns of the mobile device; and
means for predicting a current random access transmission power to be used by the mobile device based at least in part on the accessed historical transmission power, the predicted current random access transmission power configured to elicit a random access response from a base station.

23. The mobile device of claim 22, wherein the current random access transmission power comprises a random access channel (RACH) preamble transmission power.

24. The mobile device of claim 23, further comprising:
means for transmitting a RACH preamble using the predicted current random access transmission power.

25. The mobile device of claim 22, further comprising:
means for reducing a number of power ramp steps taken by the mobile device during a random access procedure based on the predicted current random access transmission power.

26. The mobile device of claim 22, further comprising:
means for reducing interference from the mobile device during a random access procedure based on the predicted current random access transmission power.

27. The mobile device of claim 22, wherein the accessed historical transmission power corresponds to at least one of a geographic location in a known physical route of the mobile device, a current cell identification (ID) in the known physical route of the mobile device, or at least one other cell ID in the known physical route of the mobile device.

28. The mobile device of claim 22, wherein the mobility patterns of the mobile device comprise a physical route previously travelled by the mobile device or another mobile device.

29. The mobile device of claim 28, further comprising:
means for recognizing that the mobile device is currently traveling along the physical route;
wherein the means for predicting the current random access transmission power of the mobile device predicts the current random access transmission power based at least in part on the recognition.

30. A non-transitory computer-readable storage medium comprising instructions executable by a processor to:
access a historical transmission power of a mobile device associated with a current state of the mobile device, the historical transmission power based on mobility patterns of the mobile device; and
predict a current random access transmission power of the mobile device based at least in part on the accessed historical transmission power, the predicted current random access transmission power configured to elicit a random access response from a base station.

* * * * *